US012531344B2

(12) United States Patent
Ushikoshi et al.

(10) Patent No.: US 12,531,344 B2
(45) Date of Patent: Jan. 20, 2026

(54) ANTENNA DEVICE AND COMMUNICATION DEVICE

(71) Applicant: DENSO CORPORATION, Kariya (JP)

(72) Inventors: Daiju Ushikoshi, Nisshin (JP); Takuya Yamashita, Kariya (JP); Shiro Koide, Kariya (JP)

(73) Assignee: DENSO CORPORATION, Kariya (JP)

( * ) Notice: Subject to any disclaimer, the term of this patent is extended or adjusted under 35 U.S.C. 154(b) by 168 days.

(21) Appl. No.: 18/462,331

(22) Filed: Sep. 6, 2023

(65) Prior Publication Data

US 2023/0420851 A1 Dec. 28, 2023

Related U.S. Application Data

(63) Continuation of application No. PCT/JP2022/012374, filed on Mar. 17, 2022.

(30) Foreign Application Priority Data

Mar. 26, 2021 (JP) ................................ 2021-053968

(51) Int. Cl.
*H01Q 9/04* (2006.01)
*H01Q 1/24* (2006.01)
(Continued)

(52) U.S. Cl.
CPC ............ *H01Q 9/0421* (2013.01); *H01Q 1/24* (2013.01); *H01Q 1/48* (2013.01); *H01Q 1/526* (2013.01); *H01Q 9/045* (2013.01)

(58) Field of Classification Search
CPC ........ H01Q 9/0421; H01Q 1/48; H01Q 9/045; H01Q 1/526; H01Q 1/24; H01Q 21/08; H01Q 9/0457
See application file for complete search history.

(56) References Cited

U.S. PATENT DOCUMENTS 5,568,155 A * 10/1996 Tsunekawa .......... H01Q 9/0421 343/846
2003/0160728 A1* 8/2003 Fukushima ............ H01Q 1/242 343/702
(Continued)

FOREIGN PATENT DOCUMENTS

JP 2009278356 A 11/2009
JP 2015177454 A 10/2015
(Continued)

OTHER PUBLICATIONS

Itoh, Jun, Michishita, Naobumi, Morishita, Hisashi, "A Study of the Mutual Coupling Reduction Between Two Inverted-F Antennas Using Mushroom-Type EBG Structures", IEICE technical report [Antennas and Propagation], IEICE Technical Report vol. 107, No. 431, A • P2007-123, The Institute of Electronics, Information and Communication Engineers, Jan. 16, 2008, pp. 7-12.

*Primary Examiner* — Hai V Tran
(74) *Attorney, Agent, or Firm* — Harness, Dickey & Pierce, P.L.C.

(57) ABSTRACT

An antenna device includes a ground plate, a line feeding element provided with a feeding point, first and second mushroom cells. Each mushroom cell includes a counter conductor plate disposed at a predetermined interval from the ground plate, and a short circuit portion electrically connecting the counter conductor plate and the ground plate. Each mushroom cell causes parallel resonance at a predetermined target frequency using an inductance of the short circuit portion and an electrostatic capacitance formed by the ground plate and the counter conductor plate. The line feeding element is disposed at an interval from the counter conductor plate of each mushroom cell, and the interval is less than a predetermined coupling limit value.

11 Claims, 18 Drawing Sheets

(51) Int. Cl.
*H01Q 1/48* (2006.01)
*H01Q 1/52* (2006.01)

(56) References Cited

U.S. PATENT DOCUMENTS

| | | | | |
|---|---|---|---|---|
| 2018/0053735 | A1 | 2/2018 | Ueda | |
| 2019/0103676 | A1* | 4/2019 | Sugimoto | H01Q 1/42 |
| 2020/0220269 | A1* | 7/2020 | Matsuura | H01Q 9/045 |
| 2020/0328519 | A1* | 10/2020 | Kakuya | H01Q 1/48 |
| 2021/0184356 | A1* | 6/2021 | Ikeda | H01Q 7/00 |

FOREIGN PATENT DOCUMENTS

| | | | |
|---|---|---|---|
| JP | 2017005663 | A | 1/2017 |
| JP | 2017153032 | A | 8/2017 |
| JP | 2018032890 | A | 3/2018 |
| JP | 2019129439 | A | 8/2019 |

* cited by examiner

ANTENNA DEVICE AND COMMUNICATION DEVICE

CROSS REFERENCE TO RELATED APPLICATIONS

The present application is a continuation application of International Patent Application No. PCT/JP2022/012374 filed on Mar. 17, 2022, which designated the U.S. and claims the benefit of priority from Japanese Patent Application No. 2021-053968 filed on Mar. 26, 2021. The entire disclosures of all of the above applications are incorporated by reference.

TECHNICAL FIELD

The present disclosure relates to an antenna device and a communication device.

BACKGROUND

According to at least one embodiment, an antenna device disclosed herein includes a ground plate that is a conductor member having a flat shape, a line feeding element that is a line conductor member formed in a non-loop shape and provided with a feeding point at an arbitrary position, a first mushroom cell including a conductor member, and a second mushroom cell including a conductor member. Each of the first mushroom cell and the second mushroom cell includes a counter conductor plate that is a conductor member having a flat shape and disposed at a predetermined interval from the ground plate, and a short circuit portion that electrically connects the counter conductor plate and the ground plate. Each of the first mushroom cell and the second mushroom cell is configured to cause parallel resonance at a predetermined target frequency using an inductance of the short circuit portion and an electrostatic capacitance formed by the ground plate and the counter conductor plate. The line feeding element is disposed such that an interval between the line feeding element and the counter conductor plate of the first mushroom cell and an interval between the line feeding element and the counter conductor plate of the second mushroom cell are less than a predetermined coupling limit value.

According to at least one embodiment, a communication device disclosed herein includes a ground plate that is a conductor member having a flat shape, a line feeding element that is a line conductor member formed in a non-loop shape and provided with a feeding point at an arbitrary position, a first mushroom cell including a conductor member, a second mushroom cell including a conductor member, and a circuit module configured to execute signal processing for transmitting or receiving a radio signal of a predetermined target frequency. Each of the first mushroom cell and the second mushroom cell includes a counter conductor plate that is a conductor member having a flat shape and disposed at a predetermined interval from the ground plate, and a short circuit portion that electrically connects the counter conductor plate and the ground plate. Each of the first mushroom cell and the second mushroom cell is configured to cause parallel resonance at the predetermined target frequency using an inductance of the short circuit portion and an electrostatic capacitance formed by the ground plate and the counter conductor plate. The line feeding element is disposed such that an interval between the line feeding element and the counter conductor plate of the first mushroom cell and an interval between the line feeding element and the counter conductor plate of the second mushroom cell are less than a predetermined coupling limit value.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
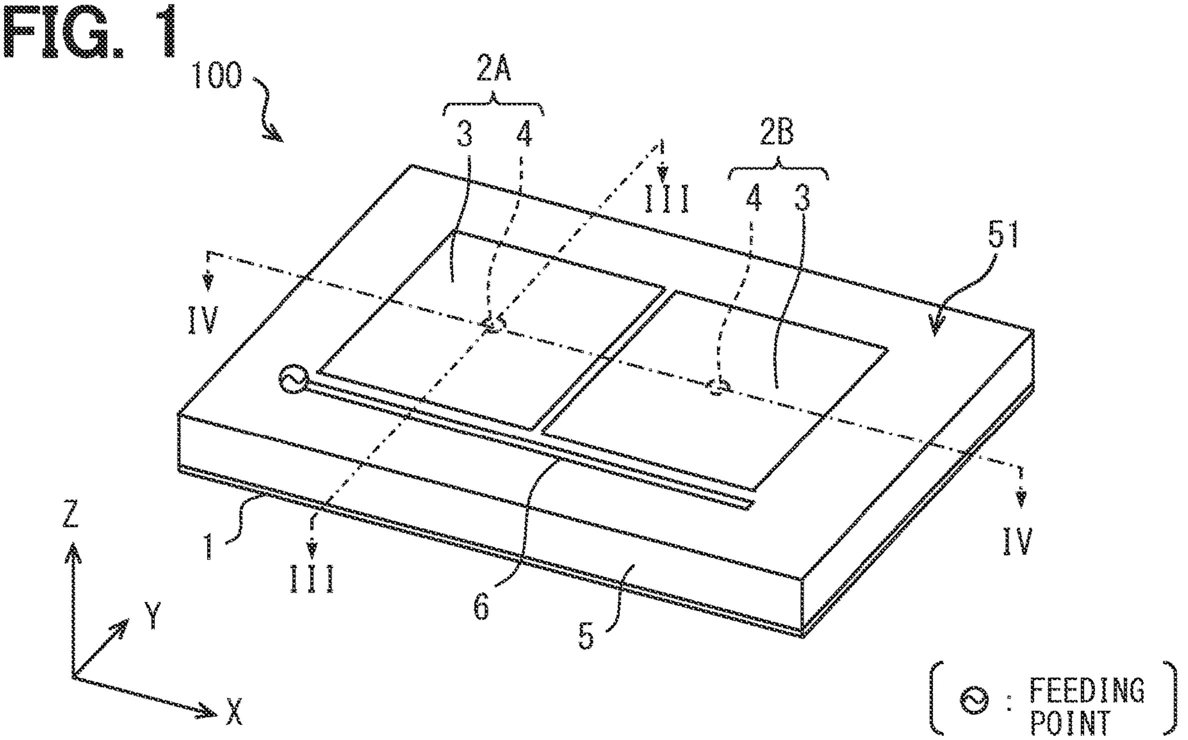
FIG. 1 is an external perspective view of an antenna device.

The present disclosure may relate to an antenna device and a communication device including an antenna using zeroth-order resonance, which is an application technology of a metamaterial.

To begin with, examples of relevant techniques will be described. An antenna according to a first comparative example has a structure including a ground plate that is a flat metal conductor functioning as a ground, a patch portion that is a flat metal conductor disposed so as to face the ground plate, and a short circuit portion that electrically connects the center of the patch portion to the ground plate. This structure is a so-called mushroom structure, which is the same as a basic structure of metamaterials. In one aspect, this type of antenna device can be understood as an antenna to which metamaterial technology is applied, and thus may be referred to as a metamaterial antenna.

In the metamaterial antenna, parallel resonance is generated due to an electrostatic capacitance formed between the ground plate and the patch portion and an inductance of the short circuit portion. This parallel resonance is generated at a frequency corresponding to the electrostatic capacitance and inductance. Among dispersion characteristics of metamaterials, a phenomenon of resonance at a frequency at which a phase constant $\beta$ is zero (0) is referred to as the zeroth-order resonance. The phase constant $\beta$ is an imaginary part of a propagation coefficient $\gamma$ of a wave propagating on a transmission line. The antenna may, in one aspect, be understood as an antenna designed to operate in a zeroth-order resonant mode at a desired operating frequency. Therefore, the antenna may also be referred to as a zeroth-order resonant antenna.

In a second comparative example, an operating frequency range of a metamaterial antenna may be extended. That is, six cells each including a triangular patch portion and a short circuit portion as one set are arranged so as to have a regular hexagonal shape as a whole, and a loop portion that is a loop-shaped conductor member is arranged outside the six cells. In the configuration of the second comparative example, a feeding point is provided in the loop portion, and power is supplied to each cell via the loop portion. In a third comparative example, four cells and a loop may be used as an improved version of the configuration of the second comparative example.

The antenna device is required to be downsized. According to the configuration of the second and third comparative examples, although an effect of extending a range of the operating frequency can be expected, it is necessary to arrange four or six cells that operate at the target frequency, and a loop-shaped feed conductor is required. Therefore, there may be a room for improvement in terms of size.

In contrast, according to the present disclosure, an antenna device and a communication device can be further miniaturized while increasing an operating frequency range.

An antenna device disclosed herein includes a ground plate that is a conductor member having a flat shape, a line feeding element that is a line conductor member formed in a non-loop shape and provided with a feeding point at an arbitrary position, a first mushroom cell including a conductor member, and a second mushroom cell including a conductor member. Each of the first mushroom cell and the second mushroom cell includes a counter conductor plate that is a conductor member having a flat shape and disposed at a predetermined interval from the ground plate, and a short circuit portion that electrically connects the counter conductor plate and the ground plate. Each of the first mushroom cell and the second mushroom cell is configured to cause parallel resonance at a predetermined target frequency using an inductance of the short circuit portion and an electrostatic capacitance formed by the ground plate and the counter conductor plate. The line feeding element is disposed such that an interval between the line feeding element and the counter conductor plate of the first mushroom cell and an interval between the line feeding element and the counter conductor plate of the second mushroom cell are less than a predetermined coupling limit value.

In the above configuration, the line feeding element is electromagnetically coupled with each counter conductor plate near the target frequency by being disposed so that the interval between the line feeding element and each counter conductor plate is less than a predetermined value. Therefore, power is indirectly supplied to each mushroom cell via the line feeding element. However, in the line feeding element, a length from the feeding point to the first mushroom cell is different from a length from the feeding point to the second mushroom cell. Therefore, inductance components derived from the line feeding element connected to the respective mushroom cells are different by a minute amount. As a result, a resonance frequency of the first mushroom cell and a resonance frequency of the second mushroom cell are also slightly different by a minute amount (for example, about 5% of the target frequency). As a result, an operating band of the entire device is widened. In the above configuration, at least two mushroom cells are enough, and four or six mushroom cells are not required. In addition, the line feeding element also need not have a loop shape. Therefore, according to the above configuration, a size of the antenna device can be further reduced while expanding the operating frequency range.

A communication device disclosed herein includes a ground plate that is a conductor member having a flat shape, a line feeding element that is a line conductor member formed in a non-loop shape and provided with a feeding point at an arbitrary position, a first mushroom cell including a conductor member, a second mushroom cell including a conductor member, and a circuit module configured to execute signal processing for transmitting or receiving a radio signal of a predetermined target frequency. Each of the first mushroom cell and the second mushroom cell includes a counter conductor plate that is a conductor member having a flat shape and disposed at a predetermined interval from the ground plate, and a short circuit portion that electrically connects the counter conductor plate and the ground plate. Each of the first mushroom cell and the second mushroom cell is configured to cause parallel resonance at the predetermined target frequency using an inductance of the short circuit portion and an electrostatic capacitance formed by the ground plate and the counter conductor plate. The line feeding element is disposed such that an interval between the line feeding element and the counter conductor plate of the first mushroom cell and an interval between the line feeding element and the counter conductor plate of the second mushroom cell are less than a predetermined coupling limit value.

According to this configuration, for the same reason as in the above-described antenna device, the size of the antenna device can be further reduced while expanding the operating frequency range.

Hereinafter, an embodiment of the present disclosure will be described with reference to the drawings. In the following embodiment, members having the same function will be assigned the same reference numeral, and the descriptions thereof will be omitted. When only a part of a configuration is described, the other parts of the configuration may employ a configuration described in a preceding embodiment.

<Introduction>

An antenna device 100 is used while being attached to a moving object such as a vehicle. In other words, the antenna device 100 is configured to be able to transmit and receive radio waves in the frequency band (so-called ISM band) specified by the International Telecommunication Union for general use in industrial and scientific fields. For convenience, a band used in radio transmission and reception by the antenna device 100 is referred to as a target frequency band. Of course, the antenna device 100 may be provided for only one of the radio transmission and reception. Since the transmission and reception of radio waves are reversible, a configuration capable of transmitting radio waves of a certain frequency is also a configuration capable of receiving radio waves of the frequency. Hereinafter, the term "transmission and reception" means at least one of transmission and reception.

Here, the main target frequency, which is the center frequency of the band of the transmission and reception, is 1.3 GHz, for example. The antenna device 100 is capable of executing transmission and reception of not only a radio wave having the main target frequency but also a radio wave having a frequency within a predetermined range that is determined with reference to the main target frequency. For example, the antenna device 100 is configured to be capable of executing transmission and reception of a radio wave having frequencies belonging to the band from 1.2 GHz to 1.4 GHz (hereinafter, 1.3 GHz band) as described later.

Of course, the main target frequency may be set appropriately. In another embodiment, the main target frequency may be, for example, 760 MHz, 850 MHz, 900 MHz, 1.17 GHz, 1.28 GHz, 1.55 GHz, 2.4 GHz or 5.9 GHz. The antenna device 100 may be configured to be capable of executing transmission and reception of radio waves in frequency bands used in short-range wireless communication such as Bluetooth Low Energy (Bluetooth is a registered trademark) and Wi-Fi (registered trademark). The antenna device 100 may be designed to operate in a frequency band used for UWB-IR (Ultra Wide Band-Impulse Radio) communication.

Hereinafter, "λ" represents a wavelength of the radio wave having the main target frequency (hereinafter, also referred to as a target wavelength). For example, "λ/2" and "0.5λ" indicate a half of the target wavelength, and "λ/4" and "0.25λ" indicate one quarter of the target wavelength. The wavelength (i.e., λ) of the radio wave of 1.3 GHz in vacuum and air is 230.6 mm. The dimensions of the following members are examples assuming the radio wave of 1.3 GHz, and can be changed according to the main target frequency. Since the frequency and the wavelength are inversely proportional to each other, for example, in a case where 2.6 GHz is set as the main target frequency, the present disclosure can be implemented using dimensions obtained by multiplying the following dimensions by ½. The dimensions of each member can be adjusted based on a fact that the effective wavelength is shortened by a dielectric.

The antenna device 100 is used by being connected via a cable to a communication ECU (i.e., Electronic Control Unit) installed in a vehicle. Signals received by the antenna device 100 are sequentially output to the communication ECU. The antenna device 100 operates based on a signal input from the communication ECU and radiates radio waves. The communication ECU uses signals received by the antenna device 100, and inputs a transmission signal to the antenna device 100.

An example case in which the antenna device 100 and the communication ECU are connected by AV wires will be described. AV wire is a low-voltage wire for automobiles, which is realized by sheathing a stranded soft-copper wire with an insulating material such as polyvinyl chloride. "λ" in "AV wire" indicates low voltage automotive wire, and "V" indicates vinyl. The AV wires connected to the antenna device 100 include a grounding cable that is an AV wire for providing a ground potential, and a signal cable that is an AV wire through which data signals are transmitted. A thin low-voltage wire for automobiles (AVSS cable) or a compressed conductor ultra-thin vinyl chloride insulated low-voltage wire for automobiles (CIVUS cable) can be used as a connection cable between the antenna device 100 and the communication ECU. "SS" in "AVSS" indicates an ultra-thin type. "C", "I", "V" and "US" in "CIVUS" indicate a compressed conductor type, ISO standards, vinyl, and an ultra-thin wall type, respectively. The cable connecting the antenna device 100 and the communication ECU may be any other communication cable such as a coaxial cable and a feeder line.

In the present disclosure, "parallel" is not limited to a completely parallel state. For example, "parallel" also includes a state inclined about 15 degrees. That is, "parallel" includes a substantially parallel state. The expression "vertical" in the present disclosure is not limited to a completely vertical state, and includes a state inclined at an angle of from several degrees to about 15 degrees. In the present disclosure, "opposed" means a state in which two objects face each other with a predetermined distance.

<Specific Configuration of the Antenna Device 100>

Hereinafter, a specific configuration of the antenna device 100 will be described. As shown in FIG. 1, the antenna device 100 includes a ground plate 1, a first mushroom cell 2A, a second mushroom cell 2B, a support portion 5, and a line feeding element 6. For convenience, the antenna device 100 illustrated in FIGS. 1 to 4 is also referred to as a proposed configuration in order to be distinguished from a basic configuration 200 and a comparative configuration 300 which will be separately described later.

Figure 2:
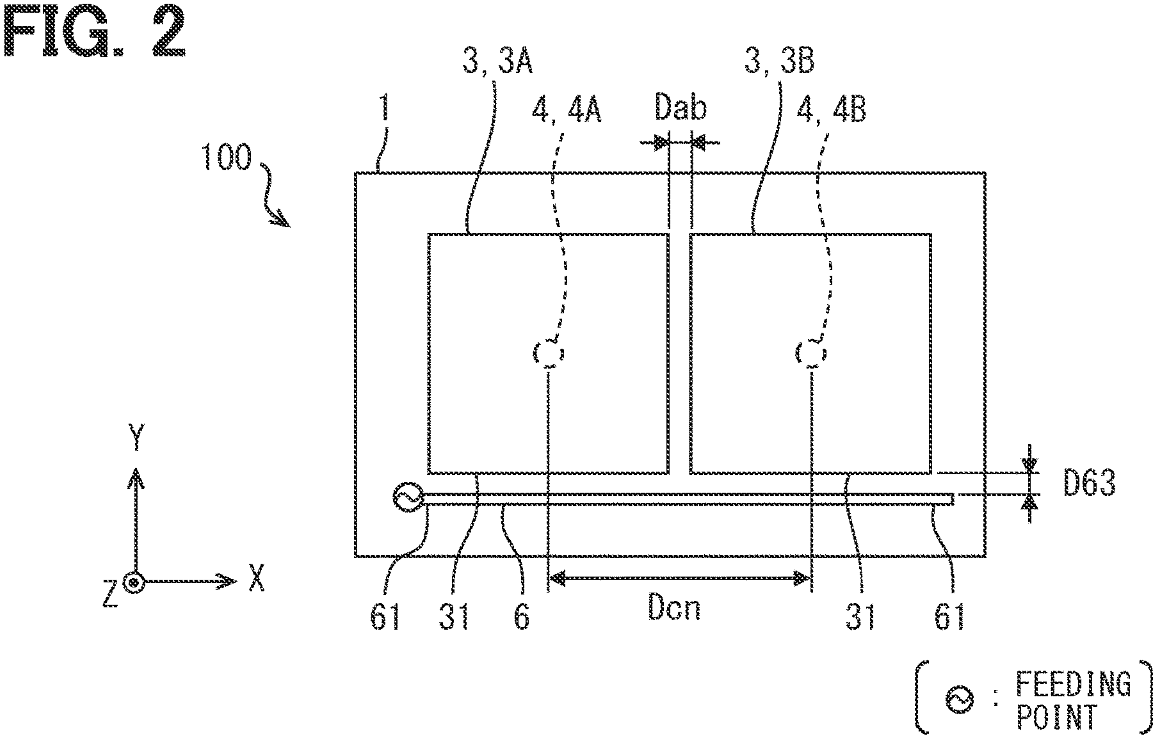
FIG. 2 is a top view of the antenna device.
Figure 3:
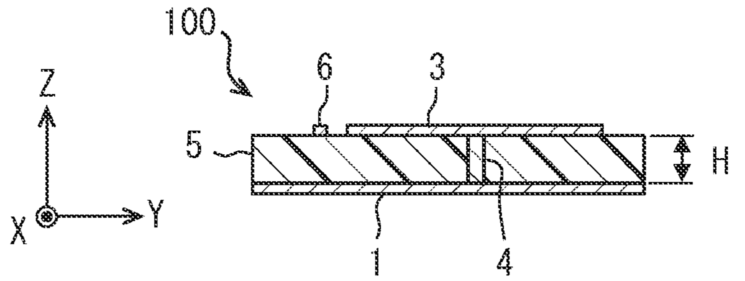
FIG. 3 is a schematic diagram illustrating a cross section taken along a line III-III shown in FIG. 1.
Figure 4:
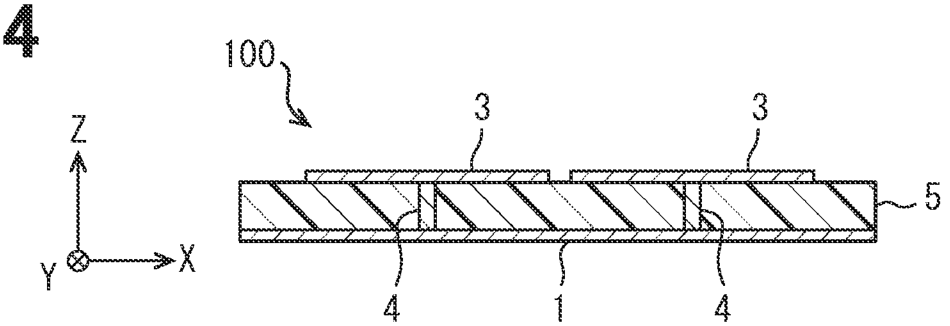
FIG. 4 is a schematic diagram illustrating a cross section taken along a line IV-IV shown in FIG. 1.

Each of the first mushroom cell 2A and the second mushroom cell 2B includes a counter conductor plate 3 and a short circuit portion 4 that electrically connects a central region of the counter conductor plate 3 to the ground plate 1. Such a structure corresponds to a mushroom structure, which is a basic structure of a metamaterial. The first mushroom cell 2A and the second mushroom cell 2B are configured to operate as metamaterial antennas in cooperation with the ground plate 1, as described below. In FIG. 2, the support portion 5 is not shown in order to clearly show the ground plate 1. When the first mushroom cell 2A and the second mushroom cell 2B are not distinguished from each other, the first mushroom cell 2A and the second mushroom cell 2B are referred to as a mushroom cell 2. The mushroom cell 2 may also be referred to as a resonator or resonant structure.

For convenience, when the counter conductor plate 3 of the first mushroom cell 2A and the counter conductor plate 3 of the second mushroom cell 2B are distinguished from each other, the counter conductor plate 3 of the first mushroom cell 2A is referred to as a first counter conductor plate 3A. The counter conductor plate 3 of the second mushroom cell 2B is referred to as a second counter conductor plate 3B. A first short circuit portion 4A means the short circuit portion 4 of the first mushroom cell 2A, and a second short circuit portion 4B means the short circuit portion 4 of the second mushroom cell 2B. When the elements of the first mushroom cell 2A and the elements of the second mushroom cell 2B are not distinguished from each other, they are simply referred to as the counter conductor plate 3 and the short circuit portion 4.

In the present embodiment, as an example, the first counter conductor plate 3A and the second counter conductor plate 3B are configured to have the same shape. The first short circuit portion 4A and the second short circuit portion 4B also have the same shape.

The first mushroom cell 2A and the second mushroom cell 2B are positioned upward of the ground plate 1 and arranged in a predetermined arrangement direction at a predetermined interval Dab. The X axis shown in various figures such as FIG. 1 represents the arrangement direction which is a direction in which the first mushroom cell 2A and the second mushroom cell 2B are arranged. That is, the X-axis direction corresponds to the arrangement direction. The X axis also indicates the height direction of the antenna device 100. The Y axis is an axis orthogonal to the X axis and the Z axis. The Y-axis direction corresponds to the width direction of the antenna device 100. A three-dimensional coordinate system including the X-axis, the Y-axis, and the Z-axis is a concept for describing the configuration of the antenna device 100. Hereinafter, the configuration of the antenna device 100 will be described using the X axis, the Y axis, and the Z axis as appropriate.

The ground plate 1 is a conductive member having a plate shape and made of conductor such as copper. The ground plate 1 is provided along a lower surface of the support portion 5 described later. The plate shape here also includes a thin film shape such as a metal foil. That is, the ground plate 1 may be a resin plate, such as a printed circuit board, having a surface on which a circuit trace formed by electroplating or the like. The ground plate 1 may also be provided as a conductor layer arranged inside a multilayer substrate having conductor layers and insulating layers. The ground plate 1 is electrically connected to a grounding cable via, for example, an power supply circuit, and provides a ground potential (in other words, ground) in the antenna device 100.

The ground plate 1 has a size to enclose the first counter conductor plate 3A and the second counter conductor plate 3B in a top view. The ground plate 1 is formed in a rectangular shape. The X-axis direction corresponds to the lengthwise direction of the ground plate 1, and the Y-axis corresponds to the widthwise direction of the ground plate 1. An electrical length of a short side of the ground plate 1 is set to 0.4λ, for example. Further, an electrical length of a long side of the ground plate 1 is set to 1.2λ. The electrical length described herein is an effective length in consideration of a fringing electric field and a wavelength shortening effect caused by a dielectric. This configuration corresponds to a configuration in which a length of the ground plate 1 in the widthwise direction is set to be shorter than the target wavelength and a length of the ground plate 1 in the lengthwise direction is set to be twice the length in the widthwise direction or more. The length of the short side of the ground plate 1 may be 0.6λ or 0.8λ, for example. The length of the ground plate 1 in the lengthwise direction may be 1.0λ or 1.5λ, for example. From a viewpoint of leakage current suppression, operation stability, or the other viewpoint, each side of the ground plate 1 preferably has a length of, for example, 0.75λ or more.

The dimensions of the ground plate 1 can be changed as appropriate. Further, the shape of the ground plate 1 viewed from above (hereinafter referred to as a planar shape) may be appropriately changed. The ground plate 1 may have a size and/or shape that overlaps substantially the entire surface of each counter conductor plate in a top view. Here, as an example, the planar shape of the ground plate 1 is a rectangular shape, but alternatively, as another aspect, the planar shape of the ground plate 1 may be a circular shape or a square shape. The planar shape of the ground plane 1 may be another polygonal shape such as a hexagon or an octagon. The rectangular shape includes rectangle and square. The circular shape can include not only a perfect circle but also an ellipse. A direction from the ground plate 1 toward the counter conductor plate 3, that is, the Z-axis positive direction corresponds to an upward direction for the antenna device 100.

Each counter conductor plate 3 is a conductive member having a plate shape and made of conductor such as copper. As described above, the plate shape here also includes a thin film shape such as copper foil. The counter conductor plate 3 is arranged so as to face the ground plate 1 via the support portion 5. Similar to the ground plate 1, the counter conductor plate 3 may also be a resin plate, such as a printed circuit board, having a surface on which a circuit trace formed by electroplating or the like.

Each of the counter conductor plate 3 is disposed so as to face the ground plate 1, thereby forming an electrostatic capacitance corresponding to the area of the counter conductor plate 3 and the interval between the counter conductor plate 3 and the ground plate 1. The counter conductor plate 3 has a size so as to generate a capacitance that resonates in parallel with an inductance of the short circuit portion 4 at the main target frequency. The area of the counter conductor plate 3 is at least appropriately designed so as to provide a desired capacitance. The desired capacitance is a capacitance that operates at the main target frequency in cooperation with the inductance of short circuit portion 4. When f is the operating frequency, Ls is the inductance of the short circuit portion 4, and C is the capacitance formed between the counter conductor plate 3 and the ground plate 1, a relationship $f \approx 1/\{2\pi\sqrt{(LC)}\}$ is established. A person skilled in this art can determine an appropriate area of the counter conductor plate 3 based on the relationship.

For example, the counter conductor plate 3 is formed in a square shape having a side of an electrical length corresponding to 60 mm. Therefore, the value 60 mm corresponds to the electrical length of 0.25λ. Of course, the length of one side of the counter conductor plate 3 may be changed as appropriate, and may be 20 mm, 30 mm or 40 mm, for example. The dimensions of the counter conductor plate 3 can be determined in consideration of the target wavelength and the wavelength shortening effect provided by the dielectric support portion 5, for example. The planar shape of the counter conductor plate 30 may be a circle, a regular octagon or a regular hexagon, for example. Further, the counter conductor plate 3 may have a rectangular shape or a long ellipse shape.

The first counter conductor plate 3A and the second counter conductor plate 3B are arranged at a predetermined interval in the X-axis direction. An edge of the first counter conductor plate 3A facing in the X-axis positive direction and an edge of the second counter conductor plate 3B facing in the X-axis negative direction are parallel to each other. A conductor plate interval Dab, which is the interval between the first counter conductor plate 3A and the second counter conductor plate 3B, is set to, for example, 0.2 mm to 3 mm.

The conductor plate interval Dab and the dimensions of the counter conductor plate 3 are set so that a center-to-center distance Dcn shown in FIG. 2 is not equal to an odd multiple of λ/4. The center-to-center distance Dcn corresponds to a distance from the center of the first counter conductor plate 3A to the center of the second counter conductor plate 3B. The center of the counter conductor plate 3 corresponds to an intersection of diagonal lines, for example, when the counter conductor plate 3 has a square shape or a rectangular shape. In the present disclosure, the center of the counter conductor plate 3 is hereinafter also referred to as a conductor plate center. When the counter conductor plate 3 has a triangular shape, an incenter thereof can be adopted as the center. The center of the triangular counter conductor plate 3 may be a perpendicular center or a circumcenter. The center of the counter conductor plate 3 is determined geometrically.

A state in which the center-to-center distance Dcn is not equal to an odd multiple of λ/4 means a state in which the center-to-center distance Dcn is equal to a value that is further different by λ/40 or more from the odd multiple of λ/4. When the center-to-center distance Dcn is equal to an odd multiple of λ/4, the second mushroom cell 2B may operate as a reflective element for the first mushroom cell 2A as disclosed in Patent Literature 1. By adjusting the center-to-center distance Dcn not to be equal to an odd multiple of λ/4, it is possible to reduce bias in directivity of the antenna device 100.

In addition, the conductor plate interval Dab is preferably set to a value at which the first counter conductor plate 3A and the second counter conductor plate 3B are high-frequency coupled. In one aspect, high-frequency coupling refers to capacitive coupling at the main target frequency. For example, the conductor plate interval Dab is set to 3 mm or less, such as 0.2 mm, 0.5 mm, or 1.0 mm. According to another aspect, the above configuration corresponds to a configuration in which a rectangular conductor having a length twice the length of the counter conductor plate 3 is divided into two by slits having a width corresponding to the conductor plate interval Dab. A coupling limit value that is an upper limit value of an interval for the coupling at the main target frequency is expected to be, for example, a value of about 0.01λ to 0.02λ. "Proximity" hereinafter means contactless and parallel arrangement with a spacing less than the coupling limit value.

Each short circuit portion 4 is a conductive member that electrically connects the ground plate 1 and the counter conductor plate 3. It is sufficient that the short circuit portion 4 is provided by using a conductive pin (hereinafter, short-circuit pin). The inductance of the short circuit portion 4 can be adjusted by adjusting a diameter and a length of the short-pin of the short circuit portion 4. A radius (r) of the short circuit portion 4 is set to, for example, 5 mm. Of course, the radius may be 1 mm or 3 mm.

The short circuit portion 4 is at least a line member having one end electrically connected to the ground plate 1 and the other end electrically connected to the counter conductor plate 3. When the antenna device 100 is provided as a printed wiring board as a base material, a via provided in the printed wiring board can be used as the short circuit portion 4.

The short circuit portion 4 is, for example, located at the conductor plate center. The position of the short circuit portion 4 may not exactly coincide with the conductor plate center. The short circuit portion 4 may be deviated by about several millimeters from the conductor plate center. The short circuit portion 4 may be formed within a central region of the counter conductor plate 3. The central region of the counter conductor plate 3 is a region inside a line connecting points that internally divide line segments from the conductor plate center to edges in a ratio of 1:5. From another point of view, the central region corresponds to a region of a figure that has a similar shape of and about ⅙ the size of the counter conductor plate 3 and is concentrically overlapped with the counter conductor plate 3.

The support portion 5 is a plate-shaped member and causes the ground plate 1 and the counter conductor plate 3 to be separated by a predetermined distance so as to face each other. The support portion 5 has a rectangular flat plate shape, and a size of the support portion 5 is substantially the same as a size of the ground plate 1 when viewed from above. The support portion 5 is provided as a dielectric material having a predetermined relative permittivity, such as glass epoxy resin. Here, as an example, the support portion 5 is realized by using a glass epoxy resin having a relative permittivity of 4.3 (in other words, FR4: Flame Retardant Type 4).

In the present embodiment, as an example, a thickness of the support portion 5 is set to 6.0 to 7.0 mm. The thickness of the support portion 5 corresponds to the distance H between the ground plate 1 and the counter conductor plate 3. By adjusting the thickness of the support portion 5, the distance H between the counter conductor plate 3 and the ground plate 1 can be adjusted. The specific value of the thickness of the support portion 5 may be appropriately determined by simulations or experiments. The thickness of the support portion 5 may be 3.0 mm or 5.0 mm, for example.

As long as the support portion 5 fulfills at least the above-mentioned function, the shape of the support portion 5 can be changed as appropriate. For example, multiple columns may cause the counter conductor plate 3 and the ground plate 1 to be arranged to face each other. Further, in the present embodiment, a resin as the support portion 5 is filled between the ground plate 1 and the counter conductor plate 3, but alternatively, the present embodiment may not be limited to this. The space between the ground plate 1 and the counter conductor plate 3 may be hollow or vacuum. The support portion 5 may have a honeycomb structure, for example. Furthermore, the exemplary structures described above may be combined with each other as well. When the antenna device 100 is realized using a printed wiring board, a plurality of conductor layers included in the printed wiring board may be used as the ground plate 1 and the counter conductor plate 3, and a resin layer separating the conductor layers may be used as the support portion 5.

The thickness of the support portion 5 also functions as a parameter for adjusting a length of the short circuit portion 4, i.e., an inductance provided by the short circuit portion 4. In addition, the thickness of the support portion 5 also functions as a parameter for adjusting a capacitance formed by the ground plate 1 and the counter conductor plate 3 facing each other.

The line feeding element 6 is a line conductor for indirectly feeding power to each counter conductor plate 3. Here, as an example, the line feeding element 6 is a straight-line conductor extending in the X-axis direction. The line feeding element 6 is formed on an upper surface 41 of the support portion 5 such that the line feeding element 6 faces the first counter conductor plate 3A and the counter conductor plate 3B in the Y-axis negative direction. That is, the line feeding element 6 is formed as a circuit trace so as to be separated in the Y-axis negative direction from the first counter conductor plate 3A and the second counter conductor plate 3B by an interval equal to or less than the predetermined coupling limit value. A distance D63 between the line feeding element 6 and each counter conductor plate 3 is set to less than 1.5 mm, such as 0.5 mm or 1.0 mm.

According to another aspect, this arrangement corresponds to an arrangement in which the first mushroom cell 2A and the second mushroom cell 2B are arranged along the line feeding element 6. The line feeding element 6 may be formed so as to be in proximity to at least a part of each counter conductor plate 3 so as to be high-frequency coupled to each counter conductor plate 3, and the arrangement can be appropriately changed.

For convenience, one of two end portions of the line feeding element 6 facing in the X-axis negative direction is referred to as a first end portion 61, and the other end portion is referred to as a second end portion 62. In addition, an edge of each counter conductor plate 3 in proximity to the line feeding element 6 is referred to as a feeding-element proximate edge 31. In the example illustrated in FIG. 1, one of two edges of each counter conductor plate 3 parallel to the X axis and facing in the Y-axis negative direction corresponds to the feeding-element proximate edge 31.

A feeding point is formed at one end of the line feeding element 6, for example, at an end portion (i.e., first end portion 61) of the line feeding element 6 facing in the X-axis negative direction. The feeding point is a portion where a signal terminal of a transceiver circuit and the line feeding element 6 are electrically connected to each other via a circuit trace including, for example, a microstrip line. The feeding point can be understood as a point of connection to a power supply or a feedline. The feeding point can be arranged at any position on the line feeding element 6. The feeding point is preferably provided in a section of the line feeding element 6 facing the first mushroom cell 2A. The mushroom cell 2 closer to the feeding point among the mushroom cells 2A and 2B can be understood as a first element.

As a method of feeding power to the line feeding element 6, various methods such as a direct connection power supply method and an electromagnetic coupling method can be adopted. The direct connection power supply method is a method in which the line feeding element 6 and a signal terminal of the transceiver circuit are electrically connected directly through a conductor such as a circuit trace or a via. The electromagnetic coupling method is a power supply method using electromagnetic coupling between the microstrip line for power supply and the line feeding element 6.

The length of the line feeding element 6, in other words, the positions of the first end portion 61 and the second end portion 62 can be appropriately changed within a range in which indirect power feeding to each counter conductor plate 3 is possible. Here, as an example, it is assumed that the line feeding element 6 extends in a range from a corner portion of the first counter conductor plate 3A facing in the X-axis negative direction to a corner portion of the second counter conductor plate 3B facing in the X-axis positive direction. In the line feeding element 6, it is preferable that the first end portion 61 is located at a position shifted from the center of the first counter conductor plate 3A in the X-axis negative direction, and the second end portion 62 is located at a position shifted from the center of the second counter conductor plate 3B in the X-axis positive direction.

The line feeding element 6 may be disposed around each counter conductor plate 3. As another configuration example, the line feeding element 6 may have an L-shape or may have a branch portion or the like, as will be separately described later. In addition, the line feeding element 6 may be disposed upward or downward of the counter conductor plate 3. The second end portion 62 may be an open end or may be terminated by a resistive element having a predetermined resistance value.

<Basic Configuration and Operation of the Metamaterial Antenna>

Figure 5:
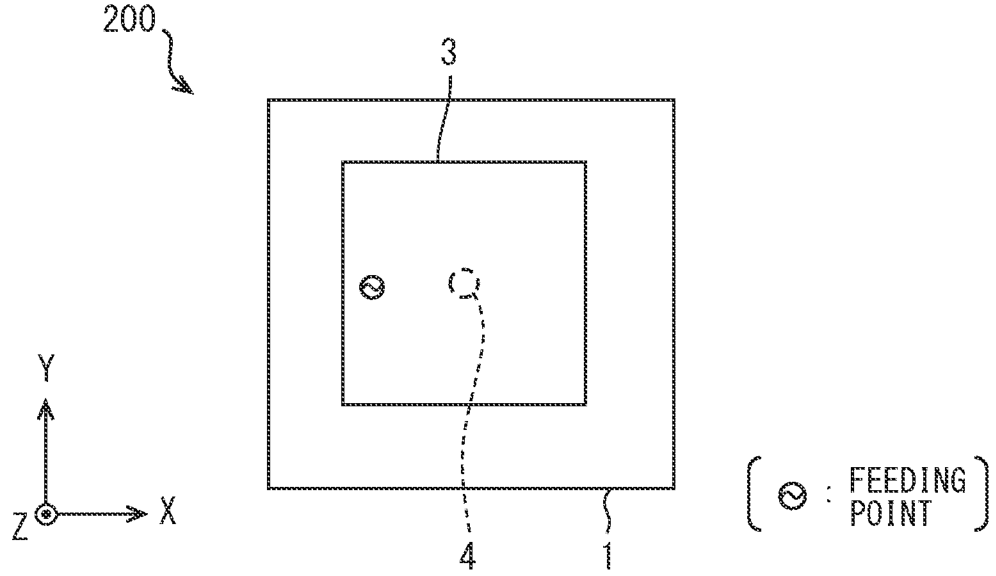
FIG. 5 is a diagram for explaining a basic configuration of a metamaterial antenna.

Before explanation of the operation of the antenna device 100, the basic configuration 200 of the metamaterial antenna and the operation principle thereof will be described with reference to FIGS. 5 and 6. FIG. 5 shows the basic configuration 200 of the metamaterial antenna, which includes a ground plate 1, a counter conductor plate 3, and a short circuit portion 4. A feeding point is arranged at a position where impedance matching can be achieved in the counter conductor plate 3. The impedance matching here means that an impedance value on the signal sending side and an impedance value on the signal receiving side are substantially the same.

The metamaterial antenna is an antenna using zero-order resonance, which is a phenomenon of resonance at a frequency at which the phase constant β becomes zero, among dispersion characteristics of the metamaterial. The metamaterial antenna is characterized in that it operates by LC parallel resonance between a capacitance formed between the ground plate 1 and the counter conductor plate 3 and an inductor of the short circuit portion 4.

The counter conductor plate 3 is designed to have an area for forming a capacitor that resonates in parallel with the inductor of the short circuit portion 4 at a desired frequency (operating frequency). In addition, the counter conductor plate 3 is short-circuited to the ground plate 1 via the short circuit portion 4 provided in a central region of the counter conductor plate 3. The value (i.e., inductance) of the inductor is determined according to the dimension of each part of the short circuit portion 4, for example, the diameter and the length of the short circuit portion 4 in the Z direction.

Therefore, when electric power of the operating frequency is supplied, parallel resonance occurs due to energy exchange between the inductor and the capacitor, and an electric field perpendicular to the ground plate 1 is generated between the ground plate 1 and the counter conductor plate 3. That is, an electric field in the Z-axis direction is generated. This vertical electric field propagates from the short circuit portion 4 toward an edge of the counter conductor plate 3, becomes a vertically-polarized wave at the edge of the counter conductor plate 3, and propagates in space. Here, the vertical-polarized wave means a radio wave in which the vibration direction of the electric field is perpendicular to the ground plate 1 and the counter conductor plate 3, and can also be referred to as ground-plate vertically-polarized wave.

Figure 6:
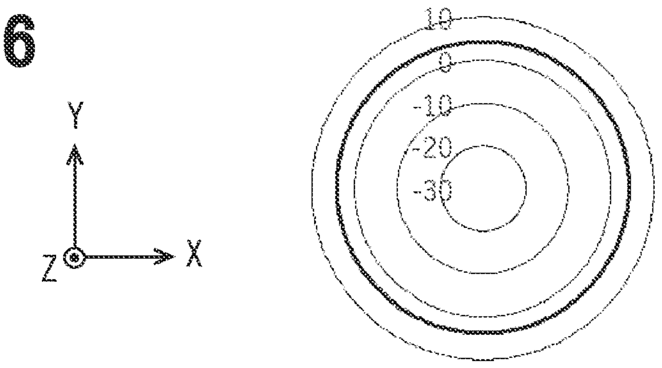
FIG. 6 is a diagram illustrating directivity of the basic configuration of the metamaterial antenna.

FIG. 6 shows a result of a simulation of generation of an electromagnetic field on the basic configuration 200. Since the propagation direction of the vertical electric field generated by the LC parallel resonance is symmetrical about the short circuit portion 4, the vertical electric field has substantially the same gain in all directions in the antenna horizontal plane. In other words, one metamaterial antenna has directivity in all directions from the central region toward the edge of the counter conductor plate 3. Therefore, when the ground plate 1 is disposed so as to be horizontal, the metamaterial antenna has the directivity in the horizontal plane direction.

The horizontal plane of the antenna here corresponds to a plane parallel to the ground plate 1 and the counter conductor plate 3. Hereinafter, a direction from the center of the counter conductor plate 3 toward the edge of the counter conductor plate 3 is also referred to as an antenna horizontal direction. According to another aspect, the antenna horizontal direction is a direction orthogonal to the Z-axis direction and includes the X-axis direction and the Y-axis direction. In short, the antenna horizontal direction corresponds to a transverse direction (i.e., lateral direction) for the antenna device.

An operation of the antenna to transmit (i.e., radiate) radio waves and an operation of the antenna to receive radio waves are reversible with each other. Although the case of radiating radio waves has been described above as an example, vertically polarized waves arriving from the antenna horizontal direction can be received in the above configuration.

In addition to the metamaterial antenna, there are a patch antenna and a plate-shaped inverted-F antenna as an antenna using a metal plate facing a ground plate. The patch antenna and the plate-shaped inverted-F antenna are antennas that use a resonance phenomenon that occurs when a path length of a current is an integer multiple of $\lambda/4$, and therefore, are different from the metamaterial antenna in terms of an operation principle. In addition, in the patch antenna and the plate-shaped inverted-F antenna, the radiating element needs to have a dimension that is an integral multiple of $\lambda/4$ in principle of their operation, whereas the metamaterial antenna does not require that the counter conductor plate 3 has a length that is an integral multiple of $\lambda/4$. Furthermore, the metamaterial antenna is also different from the patch antenna and the plate-shaped inverted-F antenna in terms of directivity. That is, the patch antenna or the plate-shaped inverted-F antenna forms a beam in a direction perpendicular to the ground plate (i.e., upward direction), whereas the metamaterial antenna basically forms a beam in the lateral direction of the antenna rather than the upward direction of the antenna. As described above, the metamaterial antenna is different from the patch antenna and the plate-shaped inverted-F antenna from the viewpoint of the operation principle, the directivity, and the like.

<Operation of the Antenna Device 100>

Based on the above-described basic configuration 200 of the metamaterial antenna, the operation of the antenna device 100 of the proposed configuration will be described here. In the above configuration, the feeding point is provided in the line feeding element 6, and the line feeding element 6 is disposed close to each counter conductor plate 3. Therefore, a current flows in a path from the line feeding element 6 to the ground plate 1 through the first counter conductor plate 3A and the first short circuit portion 4A. A current flows in a path from the line feeding element 6 to the ground plate 1 through the second counter conductor plate 3B and the second short circuit portion 4B. That is, power is indirectly supplied to each mushroom cell 2 via the line feeding element 6.

The counter conductor plate 3 of each mushroom cell 2 is short-circuited to the ground plate 1 by the short circuit portion 4 provided in the central region of the counter conductor plate 3, and the area of the counter conductor plate 3 is an area that forms an electrostatic capacitance that resonates in LC parallel with the inductance of the short circuit portion 4 at the main target frequency.

Therefore, when power at the main target frequency is supplied via the line feeding element 6, LC parallel resonance occurs in each mushroom cell 2, and each mushroom cell 2 operates as a metamaterial antenna. That is, an electric field perpendicular to both the ground plate 1 and the counter conductor plate 3 is formed between the ground plate 1 and the counter conductor plate 3, and the ground-plate vertically-polarized wave is radiated in the antenna horizontal direction.

Figure 7:
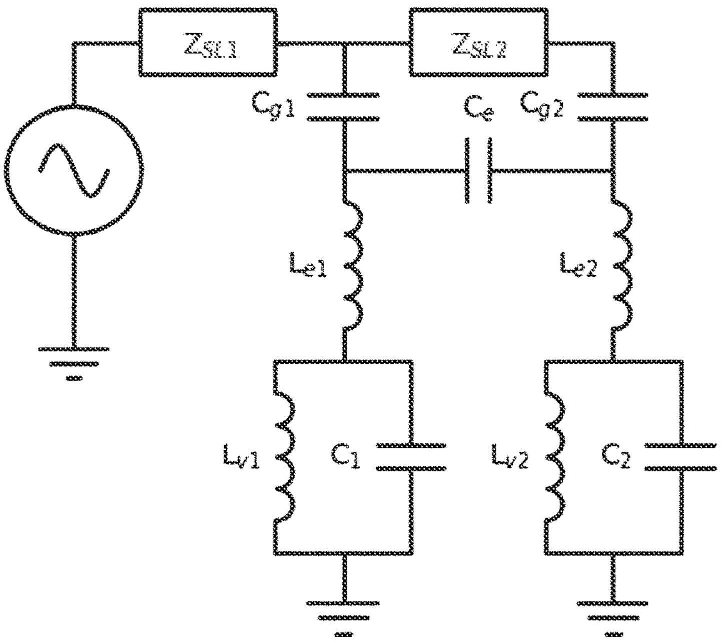
FIG. 7 is an equivalent circuit diagram of a proposed configuration.

FIG. 7 illustrates a circuit equivalent to the antenna device 100 shown in FIG. 1. ZSL1 and ZSL2 shown in FIG. 7 are the impedances of the line feeding element 6. Specifically, ZSL1 represents an impedance in a section of the line feeding element 6 in which a current flows due to excitation of the first mushroom cell 2A. In addition, ZSL2 corresponds to a parameter obtained by subtracting ZSL1 from an impedance in a section of the line feeding element 6 in which a current flows due to excitation of the second mushroom cell 2B. Cg1 represents a capacitance due to a gap between the line feeding element 6 and the first counter conductor plate 3A, and Cg2 represents a capacitance due to a gap between the line feeding element 6 and the second counter conductor plate 3B. Ce represents a capacitance due to a gap between the first counter conductor plate 3A and the second counter conductor plate 3B. Le1 represents an inductance of a path in which a current flows from the line feeding element 6 to the first short circuit portion 4A in the first counter conductor plate 3A. Le2 represents an inductance of a path in which a current flows from the line feeding element 6 to the second short circuit portion 4B in the second counter conductor plate 3B. Lv1 represents an inductance of the first short circuit portion 4A. Lv2 represents an inductance of the second short circuit portion 4B. C1 represents a capacitance formed by the first counter conductor plate 3A and the ground plate 1. C2 represents a capacitance formed by the second counter conductor plate 3B and the ground plate 1.

As shown in FIG. 7, the first mushroom cell 2A and the second mushroom cell 2B have different paths through which current flows. Therefore, an inductance component and a capacitance derived from the line feeding element 6 are slightly different between a mode in which the first mushroom cell 2A mainly operates and a mode in which the second mushroom cell 2B mainly operates. Accordingly, a resonance frequency of the first mushroom cell 2A and a resonance frequency of the second mushroom cell 2B are different from each other by a small degree. Since the resonance frequency of the first mushroom cell 2A and the resonance frequency of the second mushroom cell 2B are shifted by the small degree from each other, an entire operating band is widened around the main target frequency. Here, the small degree corresponds to, for example, 15% or less of the main target frequency, that is, 200 MHz or less. More specifically, the resonance frequencies of the first mushroom cell 2A and the second mushroom cell 2B may be different from each other by about 10 MHz to 100 MHz.

In addition, the first counter conductor plate 3A and the second counter conductor plate 3B are arranged in proximity to each other so as to be electromagnetically (i.e., radio-frequency) coupled to each other. According to this configuration, a portion that contributes to the radio wave radiation changes continuously in accordance with the frequency within the entirety including the first mushroom cell 2A and the second mushroom cell 2B. As a result, the operating frequency can be widened as compared with the basic configuration 200. Note that each mushroom cell 2 acts as a capacitive reactance at a frequency lower than its resonant frequency, and acts as an inductive reactance at a frequency higher than the resonant frequency. Even if the two mushroom cells 2 have completely the same size, the resonance frequencies of the two mushroom cells 2 are slightly different from each other due to the difference in the power supply paths as described above. Thus, depending on the frequency, the mushroom cells 2 behaves as if one mushroom cell 2 is connected to the other mushroom cell 2 in parallel as an inductive or capacitive inductance. As a result, the operating band can be further increased.

Figure 8:
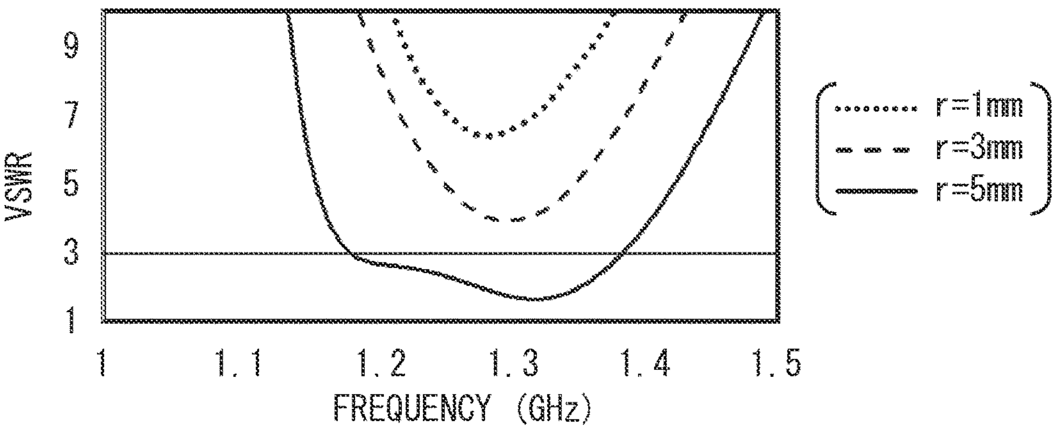
FIG. 8 is a diagram illustrating a VSWR for each frequency when a radius of a short circuit portion varies in the proposed configuration.

FIG. 8 is a graph showing a measurement result of a voltage standing wave ratio (VSWR) for each frequency when a radius r of the short circuit portion 4 is changed while the dimensions of the first counter conductor plate 3A and the second counter conductor plate 3B are kept constant in the proposed configuration. Changing the radius r corresponds to changing Lv1 and Lv2.

In the graph shown in FIG. 8, the horizontal axis represents frequency, and the vertical axis represents VSWR. The dotted line represents the VSWR for each frequency and r=1 mm, the dashed line represents the VSWR for each frequency and r=3 mm, and the solid line represents the VSWR for each frequency and r=5 mm.

As shown in FIG. 8, it can be seen that the VSWR deteriorates as the radius r of the short circuit portion 4 decreases. This is expected to be due to an increase in impedance mismatching as the radius decreases. In addition, the VSWR characteristic is the best and the operation is performed in a wide range in the configuration in which r=5 mm among configurations in which the radius r is 1 mm, 3 mm, and 5 mm.

In the technical field of communication antennas, in general, a frequency range in which the VSWR is 3 or less is often considered to be practical. According to such standards commonly used in the art, the proposed configuration can operate at a level that is sufficiently practical as an antenna for the main target frequency. According to the proposed configuration, the VSWR is 3 or less in the frequency band from 1.2 GHz to 1.4 GHz. That is, the operating band of about 200 MHz can be realized. Here, the operating band is a frequency band that can be used for transmission and reception of signals, and is regarded as a frequency range in which the VSWR is equal to or less than 3 for convenience.

Figure 9:
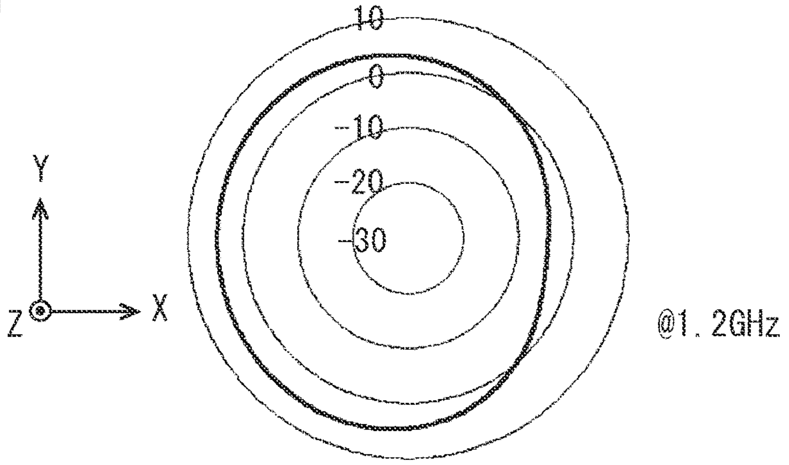
FIG. 9 is a diagram illustrating directivity at 1.2 GHz in the proposed configuration (r=5 mm).
Figure 10:
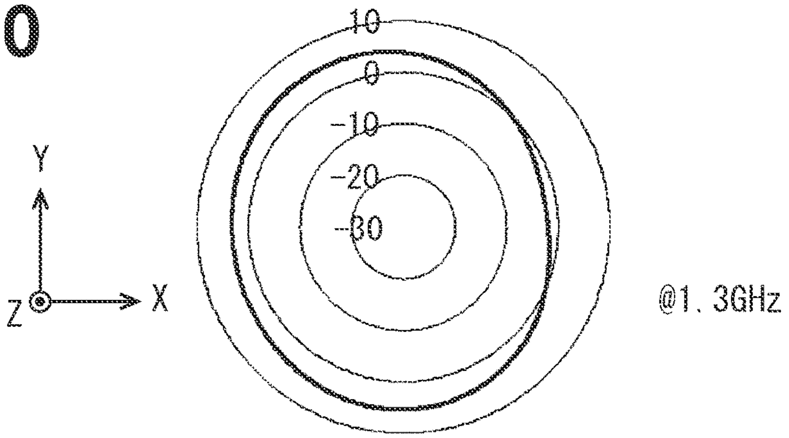
FIG. 10 is a diagram illustrating directivity at 1.3 GHz in the proposed configuration (r=5 mm).

FIGS. 9 and 10 are diagrams illustrating the directivity in the XY plane of the proposed configuration in which the radius r of the short circuit portion 4 is 5 mm. FIG. 9 shows the directivity at 1.2 GHz, and FIG. 10 shows the directivity at 1.3 GHz. As shown in FIGS. 9 and 10, in the proposed configuration as well, radiation can be obtained in all directions in the antenna horizontal direction similarly to the basic configuration 200 although deviation occurs in the X-axis direction.

Figure 11:
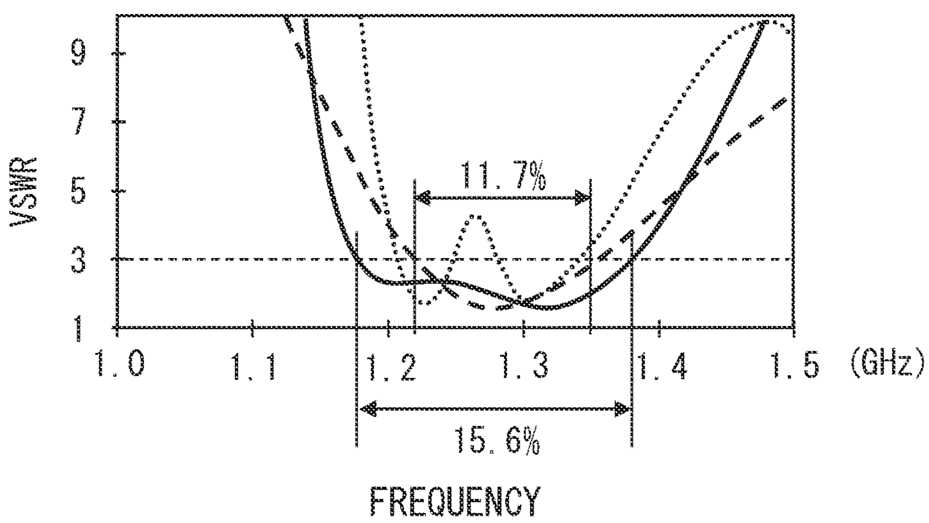
FIG. 11 is a diagram illustrating VSWR characteristics of a comparative configuration and the proposed configuration overlapped.

FIG. 11 is a graph showing the VSWR of the proposed configuration in comparison with VSWR of the 2 types of comparative configurations 300*a* and 300*b*. As shown in FIG. 12(A), the comparative configuration 300*a* is a configuration in which the line feeding element 6 is removed from the proposed configuration and a feeding point is provided at a position where impedance matching can be achieved in the first counter conductor plate 3A. The comparative configuration 300 *b* is a configuration in which a loop portion Rp that is a loop-shaped conductor element is disposed so as to surround the two counter conductor plates 3 instead of the line feeding element 6 having a straight-line shape, and a feeding point is provided in the loop portion.

Figure 12:
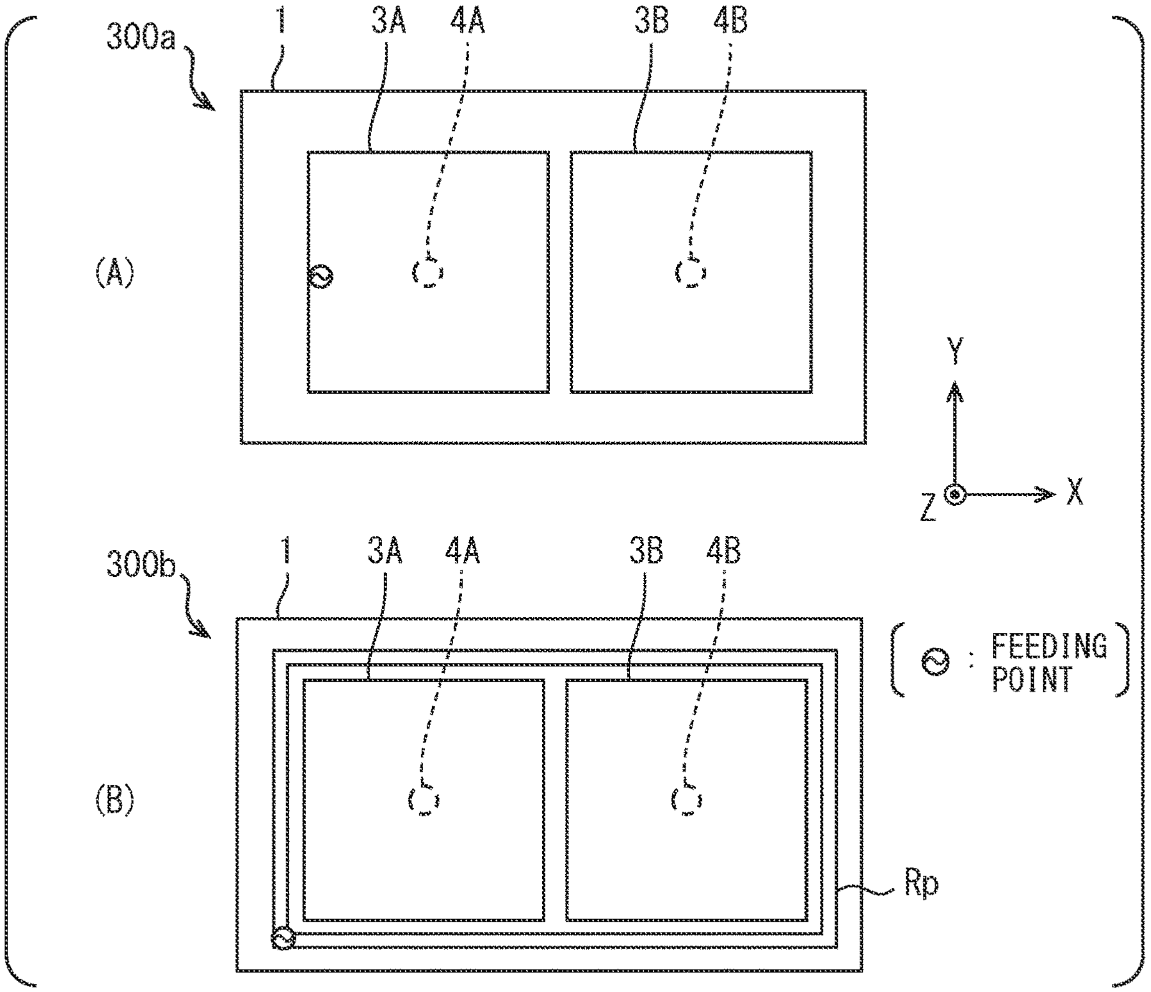
FIG. 12 is a diagram illustrating the comparative configuration.

The proposed configuration and the comparative configurations 300*a* and 300*b* have the same configurations other than the above difference. For example, the dimensions of the counter conductor plate 3, the radius of the short circuit portion 4, and the like are the same in the proposed configuration and the comparative configurations 300*a* and 300*b*. For example, the first counter conductor plate 3A of the proposed configuration and the first counter conductor plate 3A of the comparative configurations have the same dimension. In any of the configurations, the radius r of the short circuit portion 4 is set to 5 mm. Also in FIG. 12, illustration of the support portion 5 is omitted in order to clearly show the ground plate 1.

The solid line in the graph illustrated in FIG. 11 indicates the VSWR in the proposed configuration. The dashed line in the graph of FIG. 11 indicates the VSWR in the comparative configuration 300*a*, and the dotted line indicates the VSWR in the comparative configuration 300*b*. As illustrated in FIG. 11, in the comparative configuration 300*a*, the operating band that is about 11.7% of the main target frequency is realized, while in the proposed configuration, the operating band that is about 15.6% of the main target frequency is realized. As described above, according to the proposed configuration, the operating band can be extended more than that of the comparative configuration 300*a*.

Also in the comparative configuration 300*a*, the second mushroom cell 2B is electromagnetically coupled to the first mushroom cell 2A, so that the second mushroom cell 2B can also radiate radio waves. The first mushroom cell 2A and the second mushroom cell 2B have different paths from the feeding point to the short circuit portion 4, and thus have slightly different resonance frequencies. As a result, also in the comparative configuration 300, the operating band can be extended more than that of the basic configuration 200. However, since the feeding point is provided in the first mushroom cell 2A, it is difficult to excite the second mushroom cell 2B. As a result, in the comparative configuration 300, a band extension effect as large as that of the proposed configuration cannot be obtained.

Further, in the comparative configuration 300*b*, the electric field is concentrated in a gap between the loop portion and the counter conductor plate 3 at around 1.26 GHz, and antiresonance occurs. On the other hand, according to the proposed configuration, it is possible to continuously keep the VSWR to 3 or less from about 1180 MHz to about 1380 MHz without causing antiresonance.

<Effects of the Proposed Configuration>

In one aspect, the above proposed configuration corresponds to a configuration in which two mushroom cells 2 are arranged side by side and power is indirectly supplied to each mushroom cell 2 via the non-loop line feeding element 6 arranged in the proximity to the two mushroom cells 2. According to the proposed configuration, the two mushroom cells 2 operate at slightly different frequencies due to the difference in current paths, and the overall operating band is a range in which the operating bands of the mushroom cells 2 are combined. Therefore, compared to the basic configuration 200, the operating band centered on the main target frequency can be extended. The operating band can be increased compared to the comparative configuration 300.

Further, according to the proposed configuration of the present disclosure, it is not necessary to dispose the loop-shaped line conductor so as to surround the counter conductor plates. Therefore, the length of the line element for power feeding can be shortened, and the manufacturing cost can be reduced. In addition, since it is not necessary to dispose the loop-shaped line conductor so as to surround the counter conductor plates, it is possible to reduce the size as a whole.

Hitherto, while the embodiment of the present disclosure has been described, the present disclosure is not limited to the embodiment described above, and various supplementary items or modification examples to be described below are included in the technical scope of the present disclosure, and can be executed by various changes within a scope not departing from the spirit described below. For example, various supplements and/or modifications to be described below can be implemented in combination as appropriate within a scope that does not cause technical inconsistency. The members having the same functions as described above are assigned the same reference numerals, and the description of the same members will be omitted. Further, when only a part of the configuration is mentioned, the above description can be applied to the other parts.

<Supplement on the Structure of the Second Mushroom Cell 2B>

In the above-described embodiment, a configuration in which the first counter conductor plate 3A and the second counter conductor plate 3B have the same dimension is disclosed, but the present invention is not limited thereto. The first counter conductor plate 3A and the second counter conductor plate 3B may have different sizes.

Figure 13:
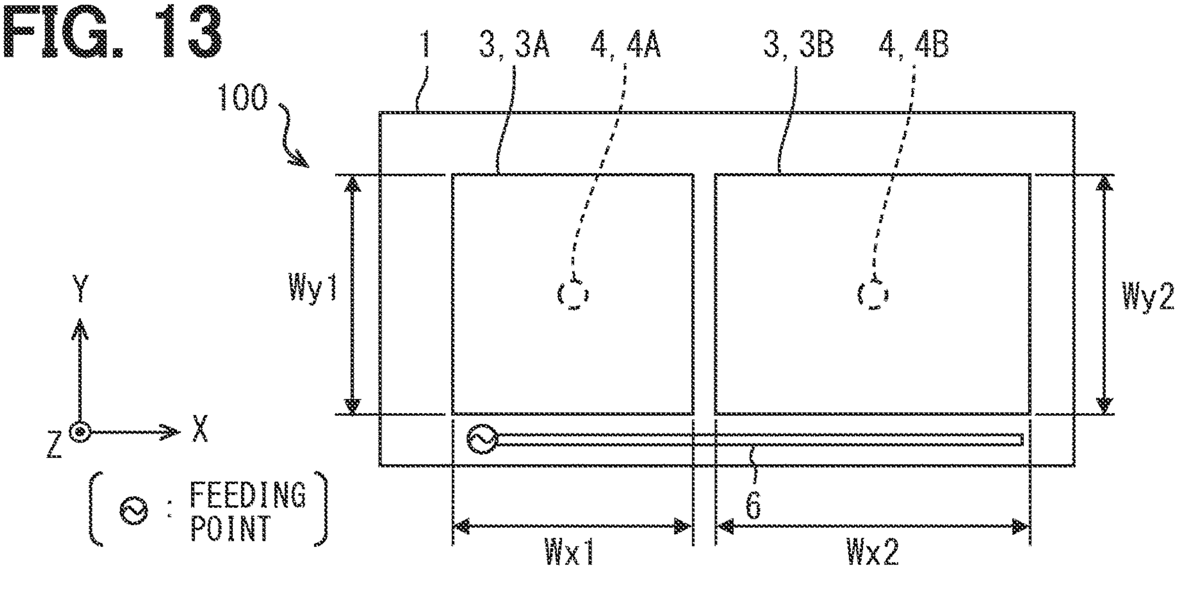
FIG. 13 is a diagram for explaining a first modified configuration.

For example, as shown in FIG. 13, a second lateral length Wx2, which is the length of the second counter conductor plate 3B in the X-axis direction, may be set to be longer than a first lateral length Wx1, which is the length of the first counter conductor plate 3A in the X-axis direction. In FIG. 13, Wy1 represents a first vertical length that is the length of the first counter conductor plate 3A in the Y-axis direction, and Wy2 represents a second vertical length that is the length of the second counter conductor plate 3B in the Y-axis direction. In the example illustrated in FIG. 13, a configuration in which Wy1=Wy2 is illustrated.

More specifically, the antenna device 100 can have Wx1=50 mm, Wx2=70 mm, and Wy1=Wy2=60 mm. The proposed configuration disclosed as the above-described embodiment corresponds to a configuration in which Wx1=Wx2=Wy1=Wy2=60 mm. For convenience, the configuration shown in FIG. 13 in which Wx1=50 mm, Wx2=70 mm, and Wy1=Wy2=60 mm is referred to as a first modified configuration. The distance between the counter conductor plate 3 and the ground plate 1 is set to a value corresponding to the relative permittivity of the support portion 5. For example, the distance between the counter conductor plate 3 and the ground plate 1 may be 6.0 mm.

Figure 14:
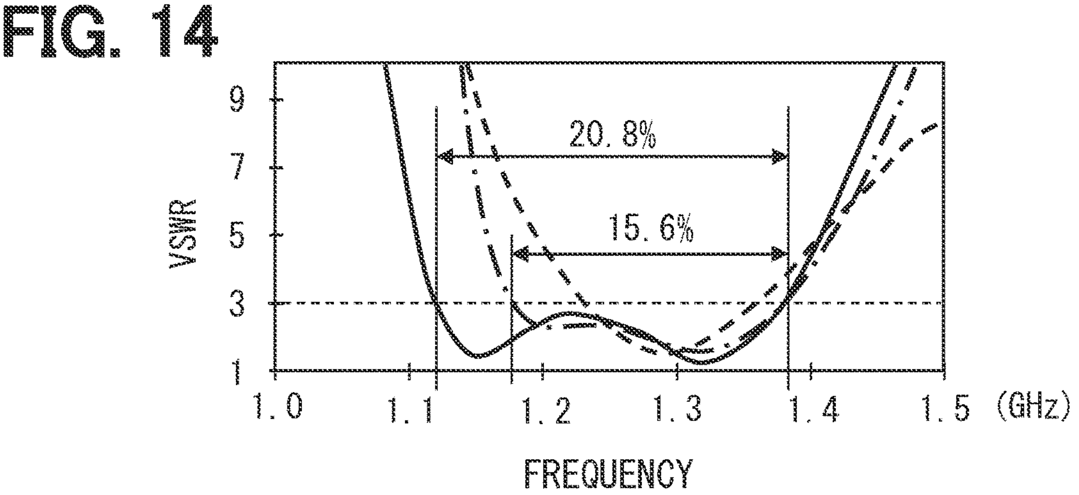
FIG. 14 is a diagram illustrating a VSWR characteristic of the first modified configuration.

FIG. 14 is a graph showing measurement results of the VSWR in the first modified configuration, the proposed configuration described above, and a comparative configuration 300 corresponding to the first modified configuration. In FIG. 14, the solid line indicates the VSWR in the first modified configuration, and the alternate long and short dash line indicates the VSWR in the proposed configuration. The dashed line indicates the VSWR in the comparative configuration 300 corresponding to the first modified configuration.

Figure 15:
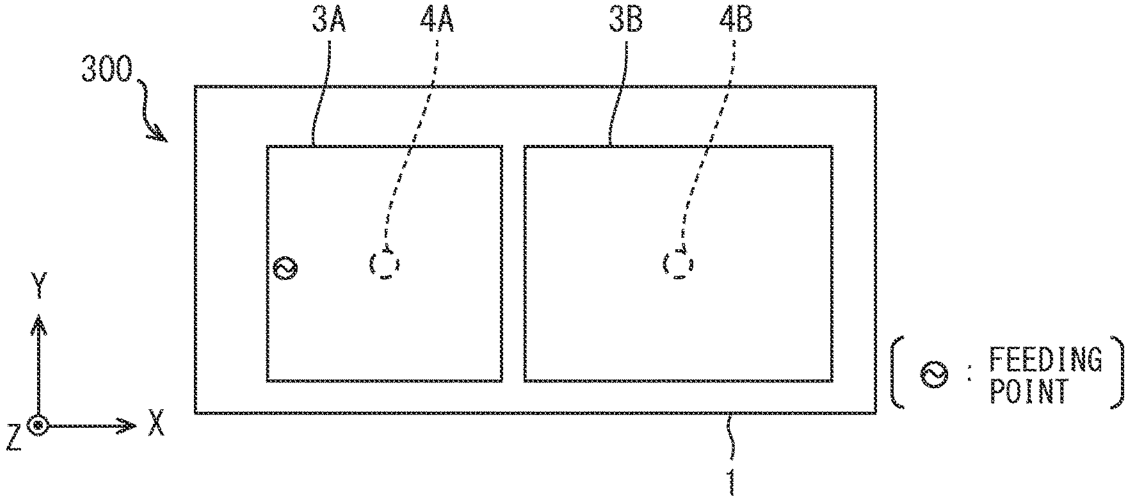
FIG. 15 is a diagram for explaining a comparative configuration corresponding to the first modified configuration.

As shown in FIG. 15, the comparative configuration 300 corresponding to the first modified configuration is a configuration in which the line feeding element 6 is removed from the first modified configuration and a feeding point is provided at a position where impedance matching of the first counter conductor plate 3A can be achieved. The comparative configuration 300 corresponding to the first modified configuration and the first modified configuration have the same portions other than the above-described difference. For example, the dimensions of the counter conductor plate 3, the radius of the short circuit portion 4, and the like are the same in the first modified configuration and the comparative configurations 300. In the simulation shown in FIG. 14, Wx1=50 mm, Wx2=70 mm, Wy1=Wy2=60 mm, and r=5 mm are set.

As illustrated in FIG. 14, according to the first modified configuration, it is possible to further expand the operating band than the proposed configuration. Specifically, while the operating band of the proposed configuration is about 15.6% of the main target frequency, the first modified configuration can expand the operating band to about 20% (20.8%) of the main target frequency. The reason for this is considered to be that the area of the first counter conductor plate 3A and the area of the second counter conductor plate 3B are made different from each other, thereby increasing the degree of divergence between the operating frequencies of the first counter conductor plate 3A and the second counter conductor plate 3B.

Figure 16:
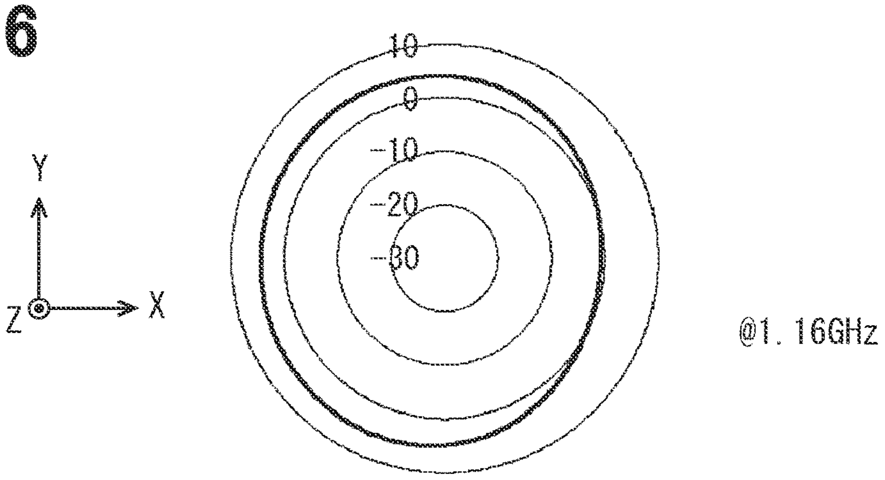
FIG. 16 is a diagram illustrating directivity at 1.16 GHz in the first modified configuration.
Figure 17:
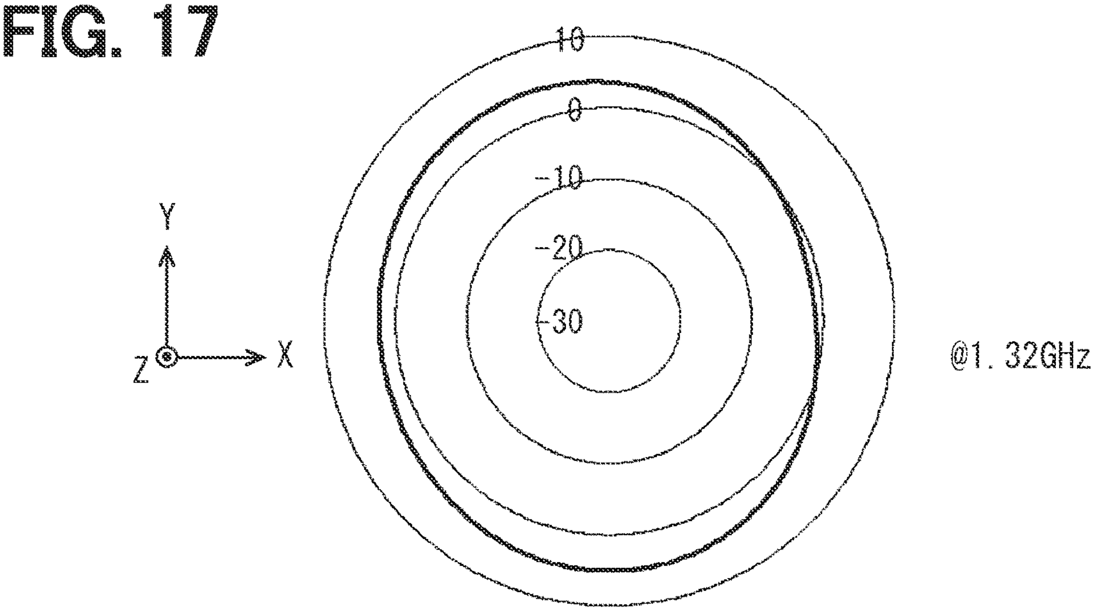
FIG. 17 is a diagram illustrating directivity at 1.32 GHz in the first modified configuration.

FIGS. 16 and 17 are diagrams illustrating the directivity in the XY plane of the first modified configuration. FIG. 16 shows the directivity at 1.16 GHz, and FIG. 17 shows the directivity at 1.32 GHz. As shown in FIGS. 16 and 17, similarly to the basic configuration 200 and the proposed configuration, the first modified configuration also has a gain of approximately 0 dB or more in all directions in the antenna horizontal direction. In addition, according to the first modified configuration, it is found that the effect of improving the gain in the X-axis positive direction, that is, a direction from the first mushroom cell 2A toward the second mushroom cell 2B can be obtained as compared with the proposed configuration.

The first modified configuration corresponds to a configuration in which the area of the second counter conductor plate 3B is set to be 1.4 times the area of the first counter conductor plate 3A. The magnification (area ratio) of the area of the second counter conductor plate 3B with respect to the area of the first counter conductor plate 3A is not limited to 1.4, and may be 1.1, 1.2, 1.3, or the like.

Figure 18:
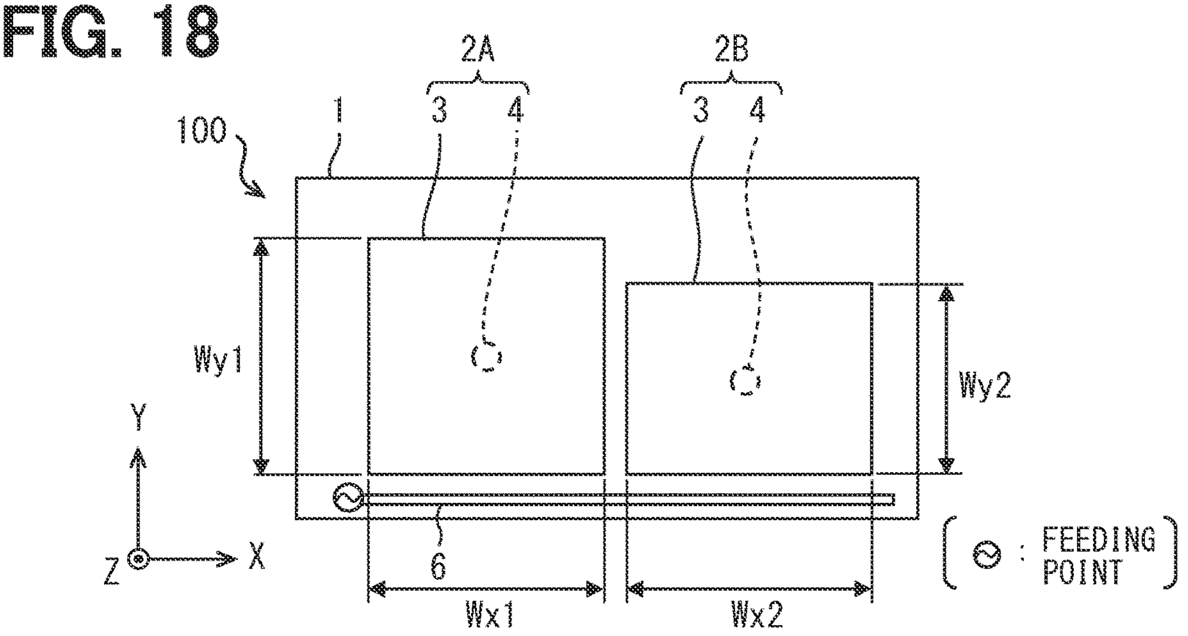
FIG. 18 is a diagram illustrating another configuration example of the proposed configuration.

As described above, the first lateral length Wx1 and the second lateral length Wx2, which are the lengths of the first counter conductor plate 3A and the second counter conductor plate 3B in the X-axis direction, are different from each other. Alternatively, the lengths of the first counter conductor plate 3A and the second counter conductor plate 3B in the Y-axis direction may be different from each other as illustrated in FIG. 18. That is, the first vertical length Wy1 and the second vertical length Wy2 may be different from each other. As an example, FIG. 18 shows a configuration in which Wy1>Wy2 and Wx1=Wx2. Of course, as still another configuration, the first counter conductor plate 3A and the second counter conductor plate 3B may be designed such that Wx1≠Wx2 and Wy1≠Wy2.

Figure 19:
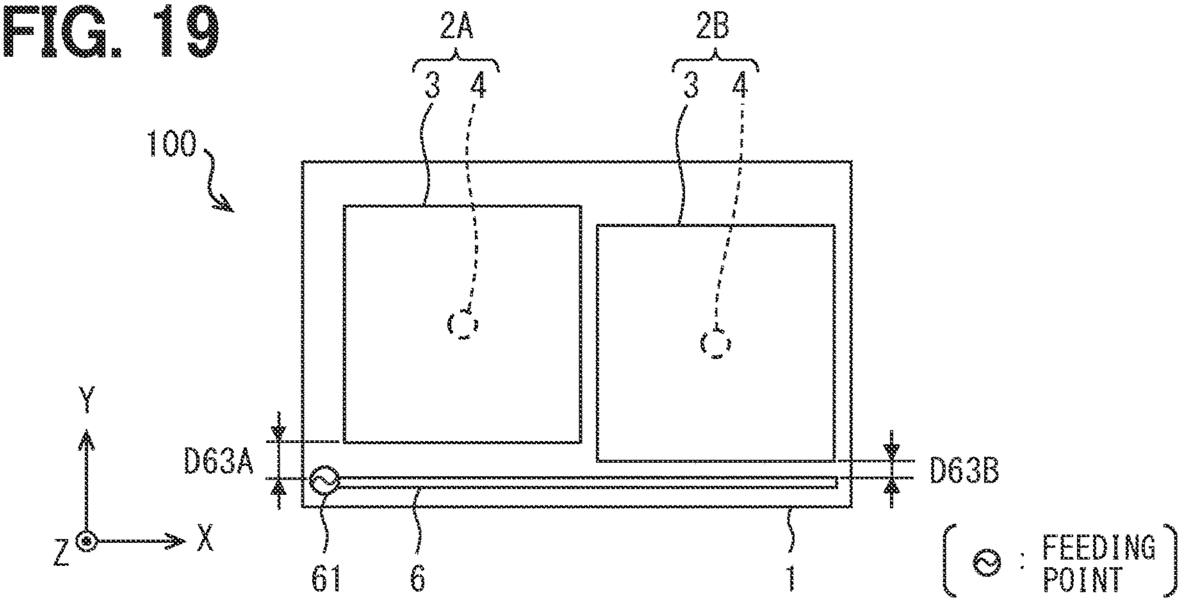
FIG. 19 is a diagram illustrating another configuration example of the proposed configuration.

As shown in FIG. 19, an interval D63A between the line feeding element 6 and the first counter conductor plate 3A and an interval D63B between the line feeding element 6 and the second counter conductor plate 3B may be different from each other. This configuration also operates in the same manner as the above-described proposed configuration and the like, and the same effect can be obtained. FIG. 19 shows a configuration in which D63A>D63B. The antenna device 100 may be configured such that D63A<D63B. A degree of electromagnetic coupling between the counter conductor plate 3 and the line feeding element 6 decreases in increase of a distance D63 between the line feeding element 6 and the counter conductor plate 3 is increased. Specifically, Cg1 shown in the equivalent circuit of FIG. 7 reduces.

<The Number of Mushroom Cells 2 and their Layout>

Figure 20:
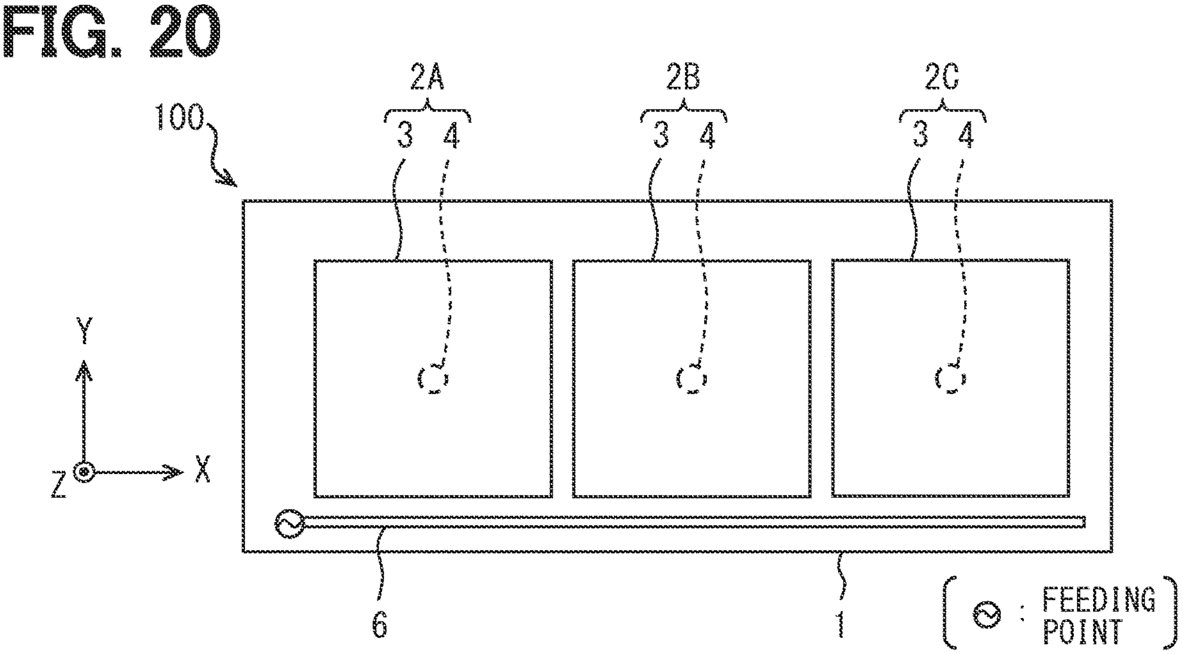
FIG. 20 is a diagram illustrating another configuration example of the proposed configuration.
Figure 21:
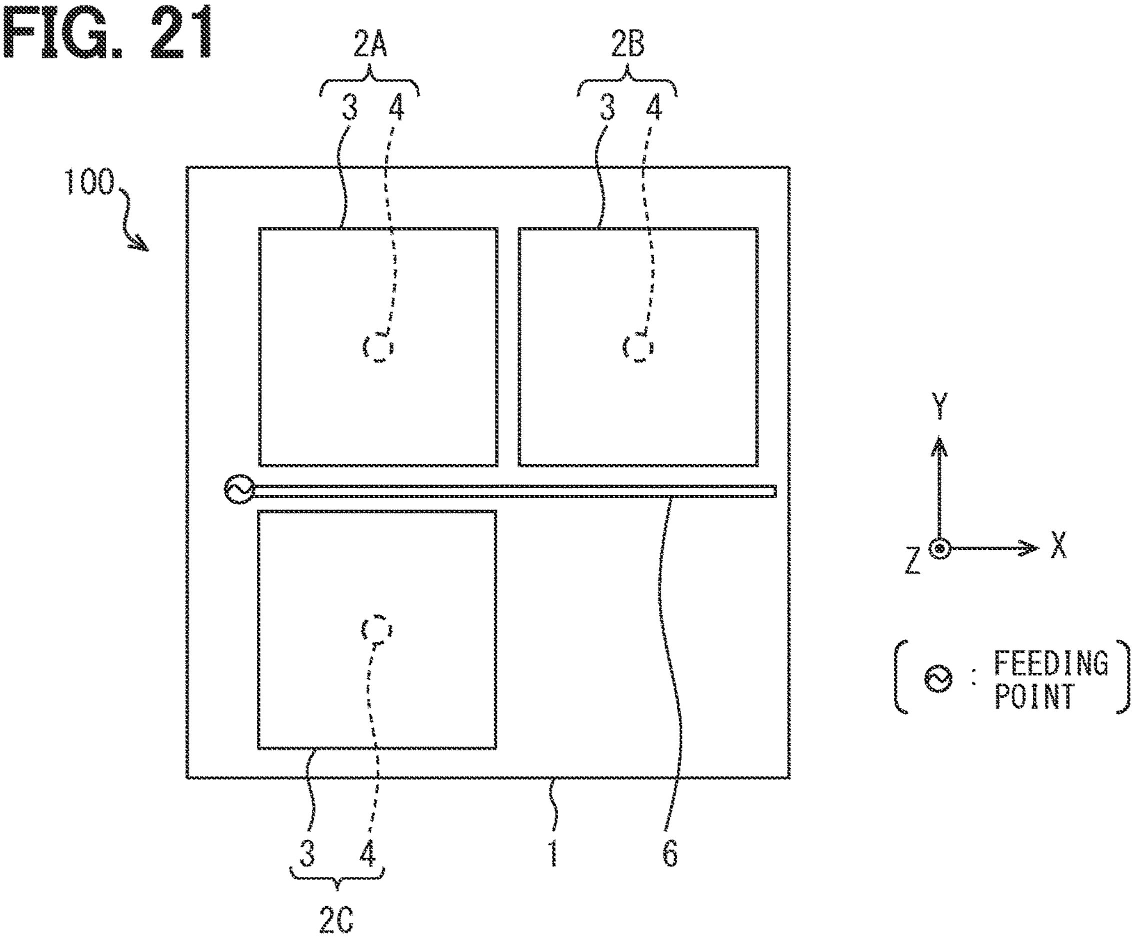
FIG. 21 is a diagram illustrating another configuration example of the proposed configuration.

Although the configuration in which two mushroom cells 2 are arranged has been described above, the present disclosure is not limited thereto. As shown in FIGS. 20 and 21, the antenna device 100 may include three mushroom cells 2. FIG. 20 discloses a configuration in which a third mushroom cell 2C is disposed to be shifted from a second mushroom cell 2B in the X-axis positive direction, in other words, a configuration in which the three mushroom cells 2 are arranged in the X-axis direction. FIG. 21 shows a configuration in which a third mushroom cell 2C is disposed to be shifted from the line feeding element 6 in the Y-axis negative direction in the above-described proposed configuration. The configuration shown in FIG. 21 corresponds to a configuration in which two mushroom cells 2 are arranged along one side of the line feeding element 6 and one mushroom cell 2 is arranged on the other side of the line feeding element 6. The dimensions of each mushroom cell 2 may be uniform or non-uniform.

In the configuration illustrated in FIG. 21, the third mushroom cell 2C has a strong tendency to operate independently rather than operating in conjunction with the first mushroom cell 2A or the second mushroom cell 2B. Therefore, the third mushroom cell 2C can be used as an antenna for a sub target frequency different from the main target frequency. For example, when the main target frequency is 1.3 GHz, the sub target frequency can be 700 MHz, 2.4 GHz, or the like. The third mushroom cell 2C can be designed to operate at the sub target frequency. As described above, according to the configuration illustrated in FIG. 21, the antenna device 100 can be operated in multiple frequency bands.

<Shape of the Counter Conductor Plate 3>

Figure 22:
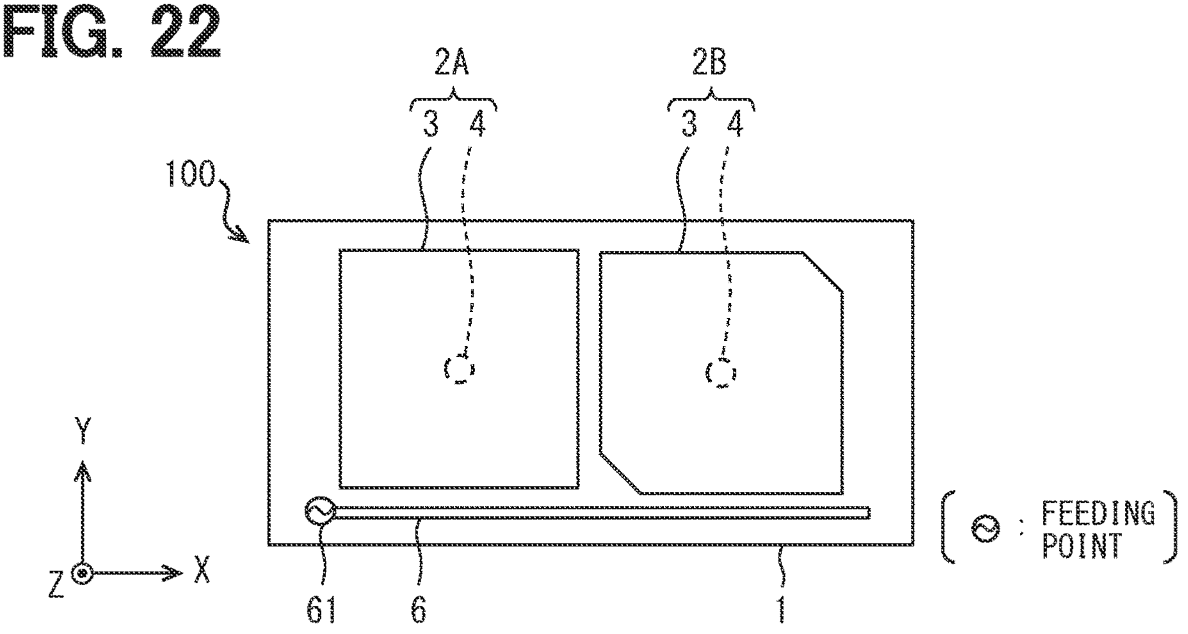
FIG. 22 is a diagram illustrating another configuration example of the proposed configuration.
Figure 23:
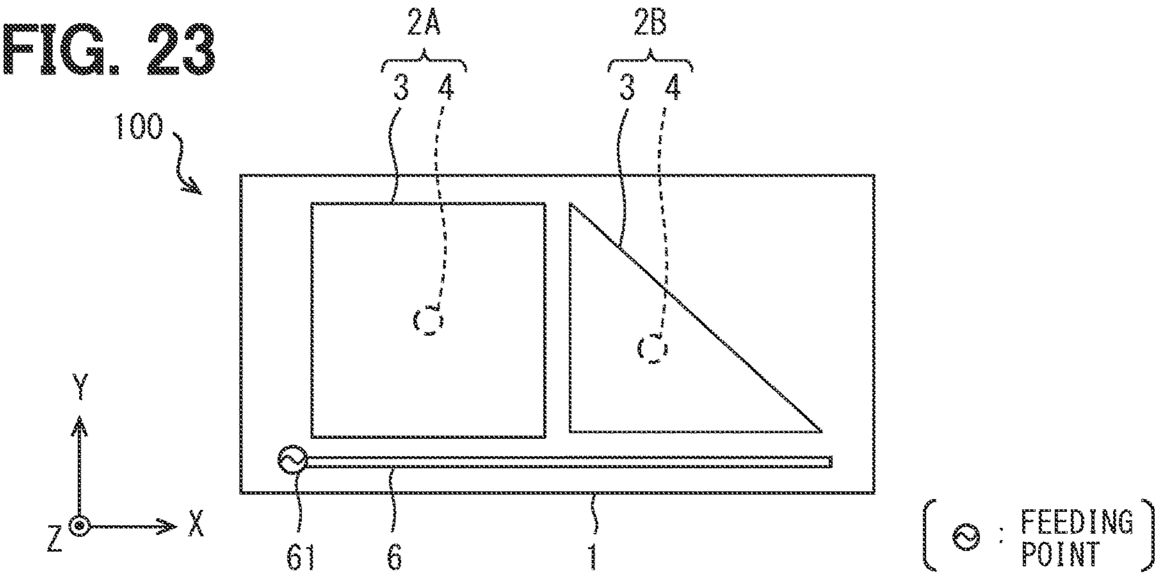
FIG. 23 is a diagram illustrating another configuration example of the proposed configuration.

As shown in FIGS. 22 and 23, various shapes can be adopted as the shape of the counter conductor plate 3. For example, as shown in FIG. 22, a second counter conductor plate 3B may have a rectangular shape in which one pair of notches are formed on diagonal corners. As shown in FIG. 23, a second counter conductor plate 3B may have a triangular shape having an edge facing an edge of the first counter conductor plate 3A and an edge facing the line feeding element 6. The second counter conductor plate 3B is preferably configured to have an edge facing each of the line feeding element 6 and the first counter conductor plate 3A at an interval less than the predetermined coupling limit value.

Although FIGS. 22 and 23 show modified examples of the second counter conductor plate 3B, the first counter conductor plate 3A may have various shapes. The first counter conductor plate 3A may be configured to have an edge facing each of the line feeding element 6 and the second counter conductor plate 3B at an interval less than the predetermined coupling limit value.

<Shape and Length of the Line Feeding Element 6>

Figure 24:
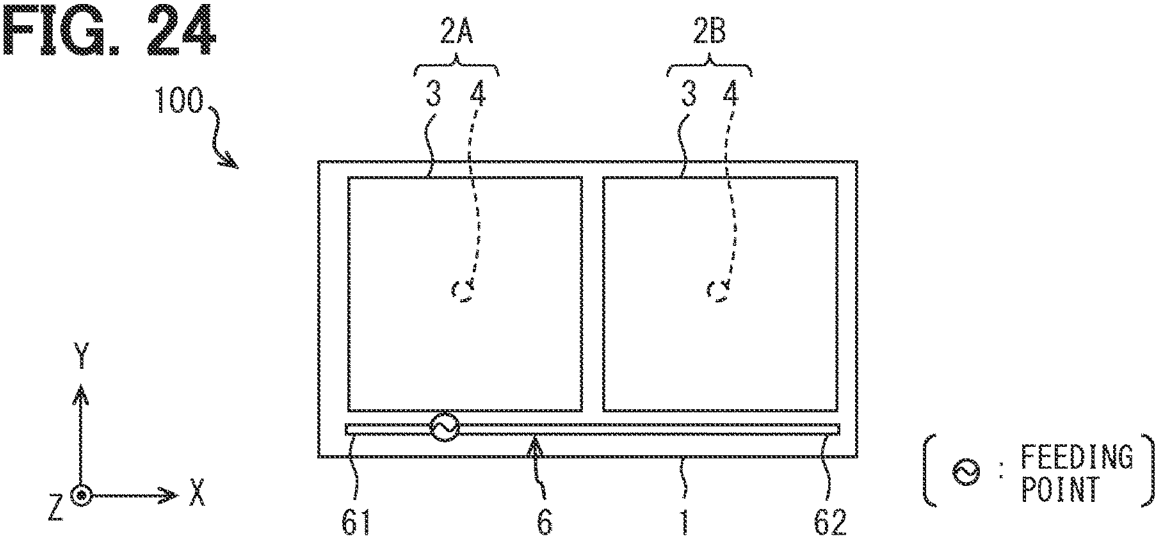
FIG. 24 is a diagram illustrating another configuration example of the proposed configuration.
Figure 25:
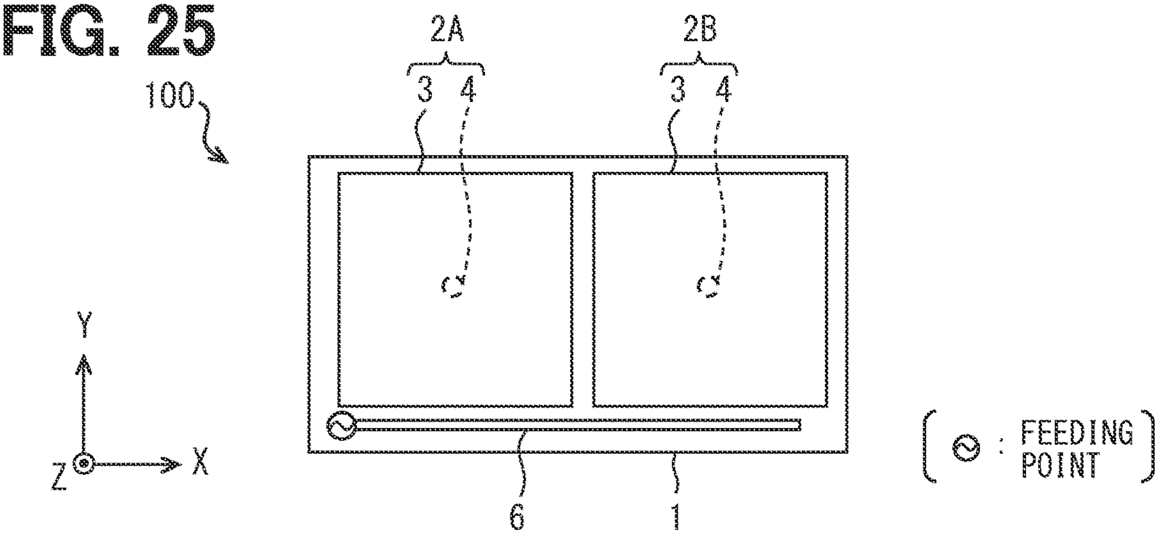
FIG. 25 is a diagram illustrating another configuration example of the proposed configuration.

In the above-described embodiment, an aspect in which the feeding point is provided at the end portion (i.e., the first end portion 61) of the line feeding element 6 facing in the X-axis negative direction is disclosed, but the present disclosure is not limited thereto. As shown in FIG. 24, the feeding point may be formed between the first end portion 61 and the second end portion 62. Further, in the above-described embodiment, an configuration in which the length of the line feeding element 6 is set to be equal to or greater than the total of the first lateral length Wx1 and the second lateral length Wx2 is disclosed, but the present disclosure is not limited thereto. As shown in FIG. 25, the length of the line feeding element 6 may be set to be shorter than the total of the first lateral length Wx1 and the second lateral length Wx2. It has been confirmed by simulation that the operating band of the line feeding element 6 is improved when the length is longer than the total of the first lateral length Wx1 and the second lateral length Wx2. Based on this finding, the length of the line feeding element 6 is preferably set to be larger by a predetermined length than the total of the first lateral length Wx1 and the second lateral length Wx2. The predetermined length here is preferably, for example, λ/50 or more. For example, the line feeding element 6 is preferably set to be longer than the total of the first lateral length Wx1 and the second lateral length Wx2 by about 9 mm to 10 mm (about λ/25).

Figure 26:
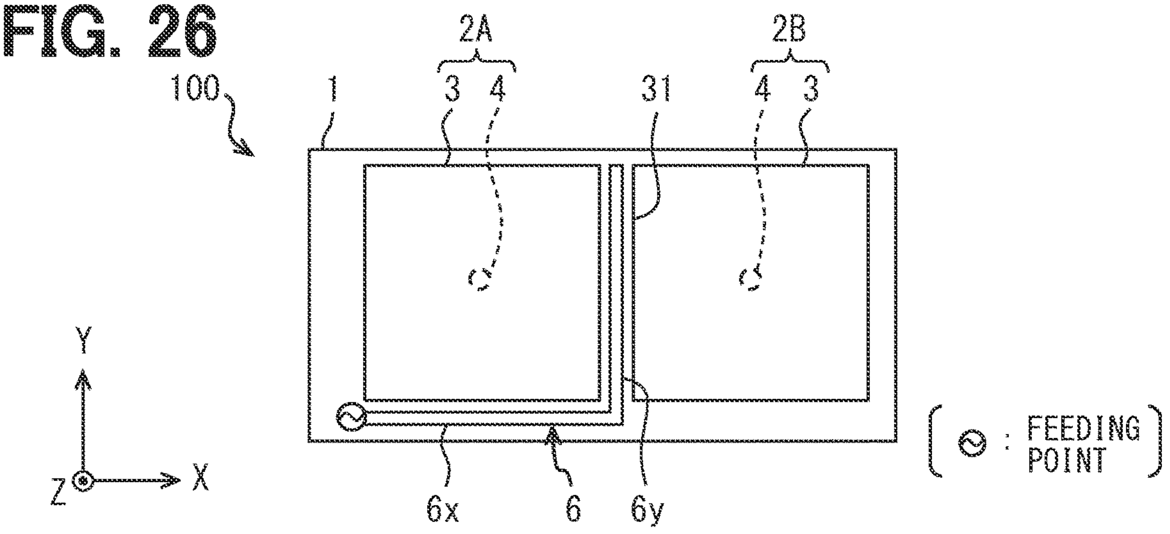
FIG. 26 is a diagram illustrating another configuration example of the proposed configuration.

In addition, in the above description, an aspect in which the line feeding element 6 has a straight-line shape parallel to the X-axis direction has been disclosed, but the present disclosure is not limited thereto. As shown in FIG. 26, the line feeding element 6 may be bent in an L shape. That is, the line feeding element 6 may be configured to have a section parallel to the X axis and in proximity to the first counter conductor plate 3A and a section parallel to the Y axis and extending between the first counter conductor plate 3A and the second counter conductor plate 3B. For convenience, in the line feeding element 6, the portion parallel to the X axis is referred to as an X-axis parallel portion 6x, and the portion parallel to the Y axis is referred to as a Y-axis parallel portion 6y. In the example illustrated in FIG. 26, a section of the line feeding element 6 extending between the first counter conductor plate 3A and the second counter conductor plate 3B corresponds to the Y-axis parallel portion 6*y*. The Y-axis parallel portion 6*y* is in proximity to each of the first counter conductor plate 3A and the second counter conductor plate 3B.

Figure 27:
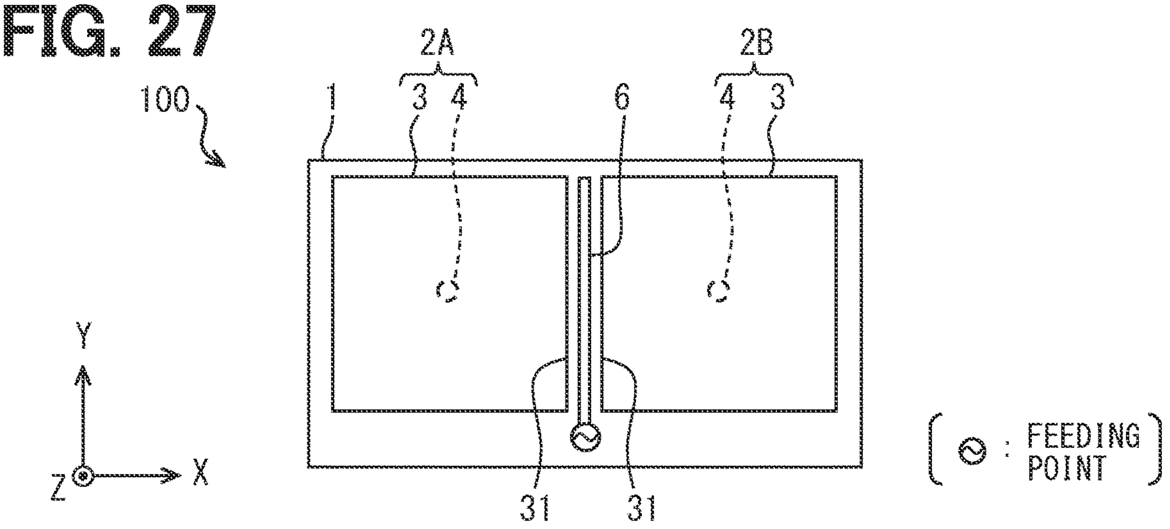
FIG. 27 is a diagram illustrating another configuration example of the proposed configuration.
Figure 28:
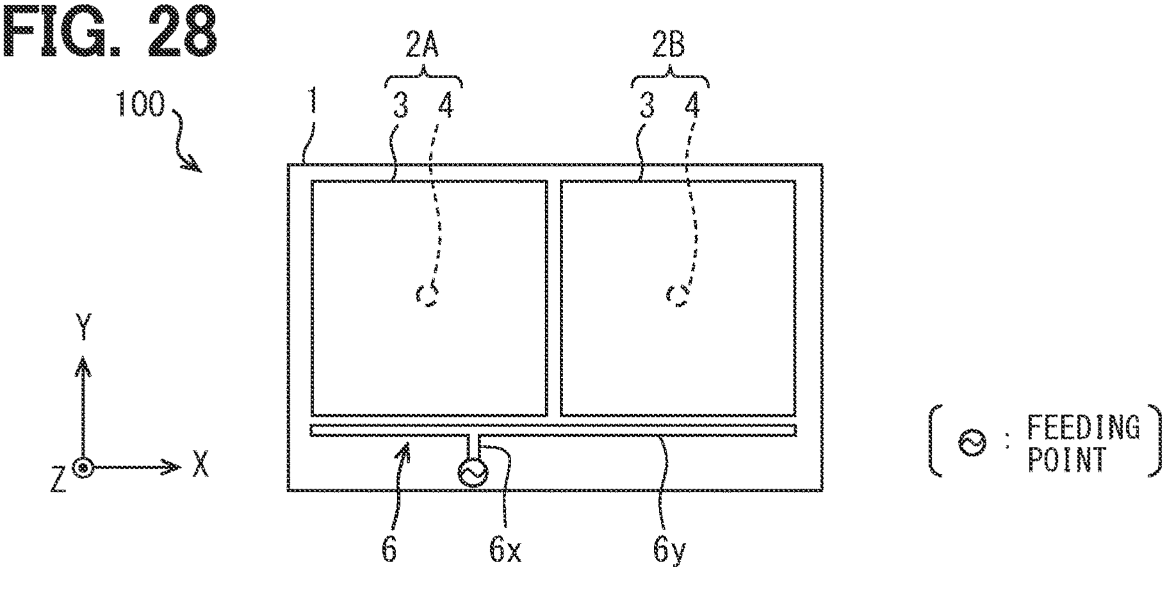
FIG. 28 is a diagram illustrating another configuration example of the proposed configuration.

Further, the line feeding element 6 may be formed in a straight line parallel to the Y axis as shown in FIG. 27. In this case, the line feeding element 6 is disposed between the first counter conductor plate 3A and the second counter conductor plate 3B. In addition, the line feeding element 6 may be formed in a substantially T-shape as shown in FIG. 28. FIG. 28 illustrates a configuration in which the feeding point is provided at a position shifted by a predetermined amount from the center of the line feeding element 6 in the X-axis negative direction, but the feeding point may be provided at the center of the line feeding element 6.

Figure 29:
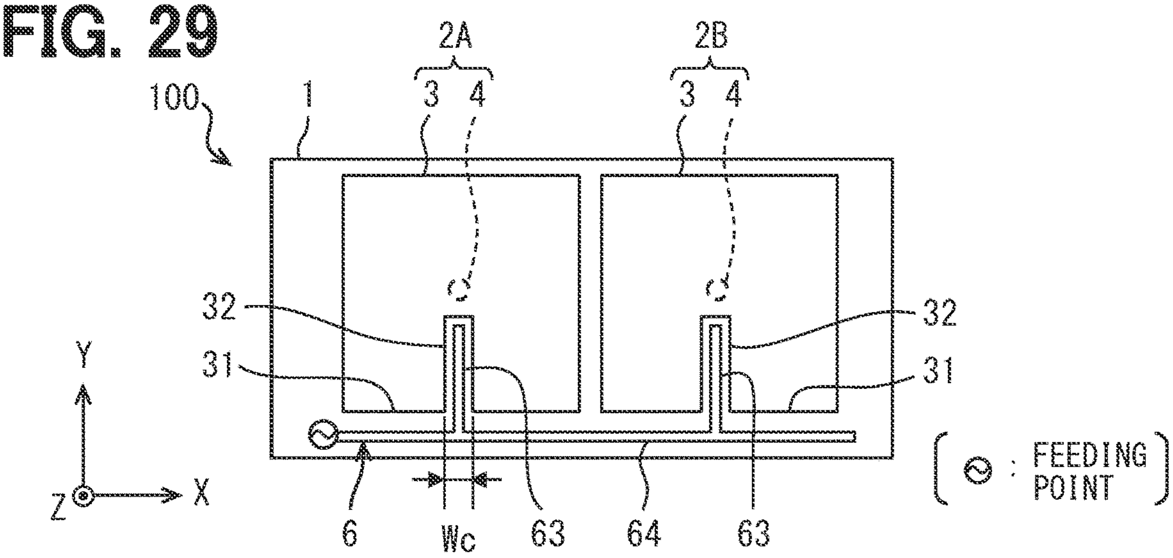
FIG. 29 is a diagram for explaining a second modified configuration.

In addition, as shown in FIG. 29, each counter conductor plate 3 may be provided with a cut portion 32 having a predetermined width from the feeding-element proximate edge 31 toward the conductor plate center, and the line feeding element 6 may be provided with a branch portion 63 extending through the inside of the cut portion 32 toward the conductor plate center. Here, the conductor plate center can be read as a connection point between the short circuit portion 4 and the counter conductor plate 3. As shown in FIG. 29, the configuration in which the branch portion 63 extending toward the center of each counter conductor plate 3 is provided in the line feeding element 6 is also referred to as a second modified configuration. For convenience, a portion other than the branch portion 63 in the line feeding element 6 is referred to as a main line portion 64.

The cut portion 32 has a straight-line shape. A cut width Wc, which is the width of the cut portion 32, is set to a value capable of maintaining non-contact with the branch portion 63. For example, the cut width Wc is set to be 1 mm to 2 mm larger than the width of the branch portion 63. If the width of the branch portion 63 is 3 mm, the cut width Wc can be set to about 5 mm to 6 mm. When the width of the branch portion 63 is 2 mm, the cut width Wc can be set to about 4 mm. The cut portion 32 is provided, for example, at a position closest to the conductor plate center in the feeding-element proximate edge 31. In other words, the cut portion 32 can be formed along a perpendicular line extending from the conductor plate center to the feeding-element proximate edge 31. The position of the cut portion 32 may be shifted to the left or right from the conductor plate center by a predetermined amount.

The length of the cut portion 32 in the Y-axis direction is set to be less than a half of the length of the counter conductor plate 3 in the Y-axis direction so that an end of the cut portion 32 does not reach a position directly above the short circuit portion 4. The length of the cut portion 32 is set, for example, in a range of 25% to 99% of a distance from the conductor plate center to the feeding-element proximate edge 31. More specifically, when the length of the counter conductor plate 3 in the Y-axis direction is 60 mm, that is, when the distance from the conductor plate center to the feeding-element proximate edge 31 is 30 mm, the length of the cut portion 32 can be set to 20 mm, 24 mm, 25 mm, 26 mm, or the like. The length of the cut portion 32 is set so as to achieve impedance matching as described later. The branch portion 63 is a line conductor disposed so as not to come into contact with the counter conductor plate 3 inside the cut portion 32 described above.

In the basic configuration 200 of the metamaterial antenna, since the feeding point is provided on the counter conductor plate 3, the feeding point can be provided at any position where impedance can be matched. On the other hand, in the antenna device 100 as the above-described proposed configuration, since the feeding point is provided on the line feeding element 6, there is a difficulty in manufacturing to achieve impedance matching. With respect to such a difficulty, according to the configuration illustrated in FIG. 29, a substantial power supply position can be adjusted relative to the counter conductor plate 3. As a result, there is an advantage that impedance matching can be easily achieved.

The operating frequency can be lowered with increase in inductance of the short circuit portion 4 or increase in capacitance formed by the counter conductor plate 3. The inductance of the short circuit portion 4 increases as the radius r of the short circuit portion 4 decreases. The capacitance increases as the area of the counter conductor plate 3 increases. That is, practically, the operating frequency can be lowered as the radius r of the short circuit portion 4 is reduced or as the size of the counter conductor plate 3 is increased. However, since an increase in the area of the counter conductor plate 3 leads to an increase in the size of the device, there is a technical demand for avoiding the increase in the area of the counter conductor plate 3.

Figure 30:
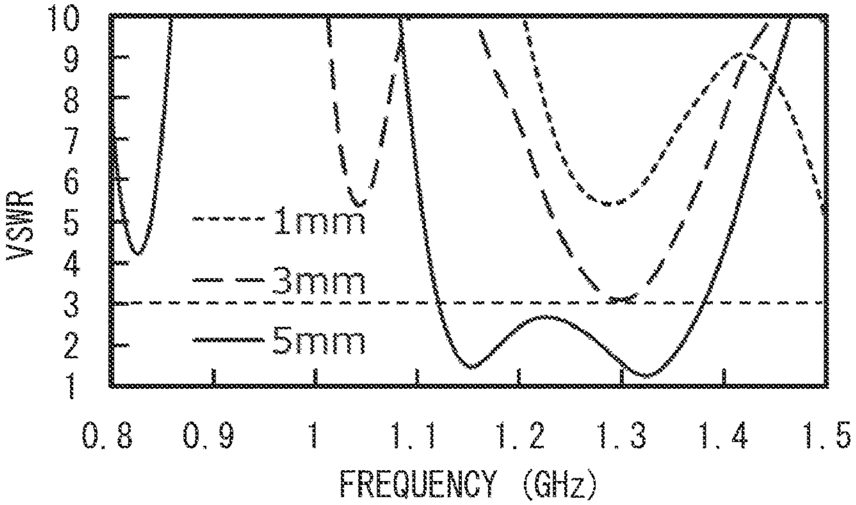
FIG. 30 is a diagram for explaining that a frequency at which a VSWR is 3 or less decreases with decrease in radius of a short circuit portion.

Based on such circumstances, the developers of the present disclosure have studied to reduce the operating frequency of the antenna device 100 by reducing the radius r of the short circuit portion 4. However, as a result of the studies based on the above policy, the developers have found that the VSWR deteriorates as the radius of the short circuit portion 4 decreases as shown in FIG. 30. It is considered that this is because, as the radius r decreases, the distance from the feeding-element proximate edge 31 to the short circuit portion 4 increases, and the degree of impedance mismatching increases. In FIG. 30, the dotted line indicates the VSWR when r=1 mm, the dashed line indicates the VSWR when r=3 mm, and the solid line indicates the VSWR when r=5 mm. FIG. 30 is a simulation result in a case where Wy1=Wy2=60 mm, Wx1=50 mm, Wx2=60 mm, Dab=0.2 mm, Wc=5 mm, and the length of the cut portion 32 is set to 26 mm in the configuration shown in FIG. 29.

With respect to such a new finding, according to the configuration illustrated in FIG. 29, a substantial power supply position can be formed inside the feeding-element proximate edge 31, and impedance matching can be easily achieved. That is, by adopting the T-shape as shown in FIG. 29 as the structure of the line feeding element 6, a decrease in the operating frequency can be realized while reducing the antenna size.

Figure 31:
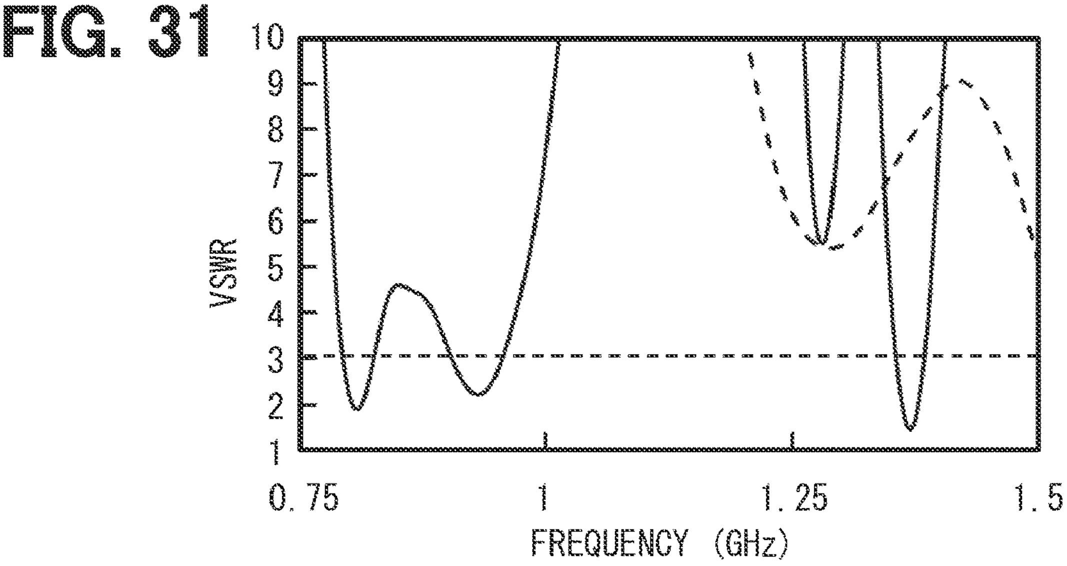
FIG. 31 is a diagram illustrating a VSWR characteristic of the second modified configuration (r=1 mm).
Figure 32:
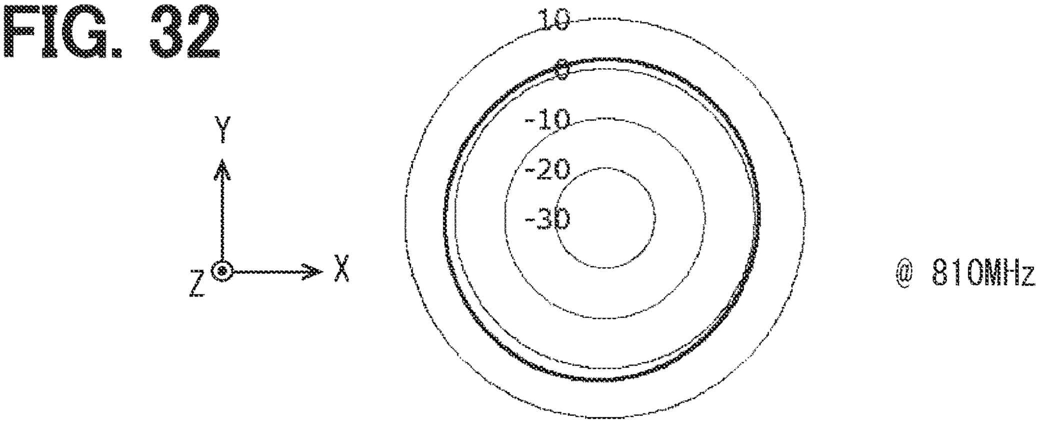
FIG. 32 is a diagram illustrating directivity at 810 MHz in the second modified configuration (r=1 mm).
Figure 33:
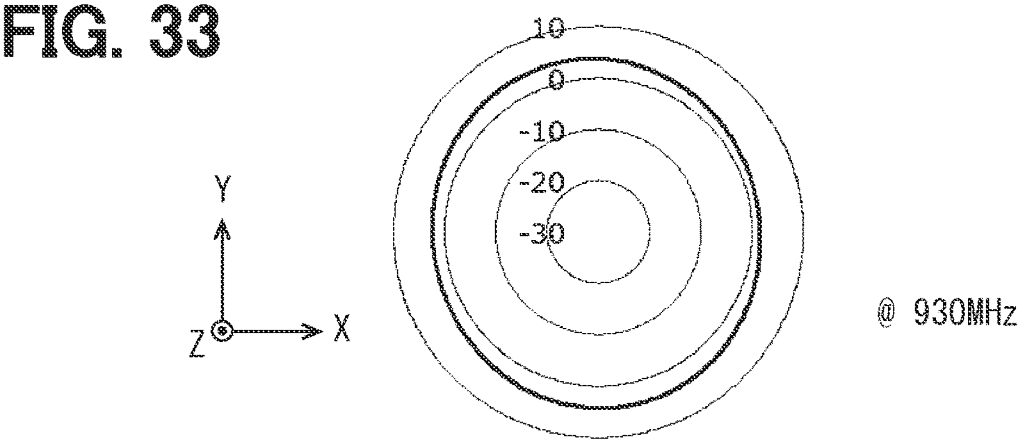
FIG. 33 is a diagram illustrating directivity at 930 MHz in the second modified configuration (r=1 mm).

FIG. 31 shows the results of measuring the VSWR when the short circuit portion 4 has a radius of 1 mm, the length of the cut portion 32 is 24 mm, and the branch portion 63 extends to 1 mm before the end of the cut portion 32. The distance between the end of the cut portion 32 and the conductor plate center is 5 mm, the cut width Wc is 5 mm, and the width of the branch portion 63 is 3 mm. According to this configuration, as shown in FIG. 31, the antenna device 100 can be operated as a metamaterial antenna even at 810 MHz and 930 MHz while maintaining the dimensions of the counter conductor plate 3. FIG. 32 shows the directivity at 810 MHz, and FIG. 33 shows the directivity at 930 MHz. As shown in FIGS. 32 and 33, it can be seen that sub frequencies other than the main target frequency also exhibit non-directivity in the antenna horizontal direction and the antenna device 100 operate as a metamaterial antenna.

<Supplement on Overall Configuration>

Figure 34:
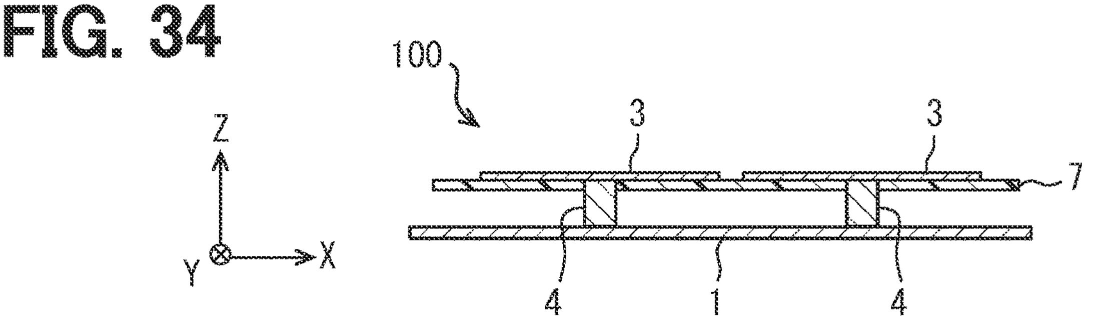
FIG. 34 is a diagram illustrating another configuration example.

In the above-described embodiment, as an example, a configuration is disclosed, in which the counter conductor plate 3 is disposed on the upper surface of the plate-shaped support portion 5 and the ground plate 1 is disposed on the back surface of the support portion 5. In other words, a configuration is disclosed, in which the dielectric material is filled between the counter conductor plate 3 and the ground plate 1. However, the present disclosure is not limited thereto. For example, as shown in FIG. 34, the antenna device 100 may include a dielectric plate 7 having a surface provided with a circuit trace as the counter conductor plate 3, and the space between the ground plate 1 and the dielectric plate 7 may be hollow. The thickness of the dielectric plate 7 can be 0.5 mm to 2.5 mm, for example, 0.8 mm.

The dielectric plate 7 may be fixed to the ground plate 1 by the short circuit portion 4, or may be fixed to the ground plate 1 by a member serving as a support column (not shown). The material of the support column may be a dielectric or a conductor. Of course, the counter conductor plate 3 may be a sheet metal having a thickness capable of maintaining the plate-like shape by itself. When the counter conductor plate 3 is made of the sheet metal, the dielectric plate 7 can be omitted.

Figure 35:
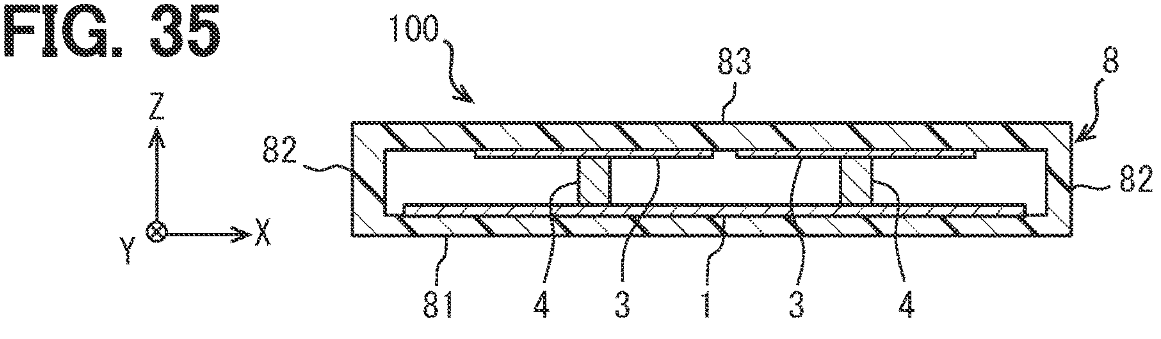
FIG. 35 is a diagram illustrating another configuration example.

In addition, the antenna device 100 can include a casing 8 that houses the counter conductor plate 3 and the like. The counter conductor plate 3 and the line feeding element 6 may be integrated with an inner surface of the casing 8. According to this configuration, a member for supporting the counter conductor plate 3 can be omitted. FIG. 35 is a schematic diagram illustrating an internal configuration of the casing 8. FIGS. 34 and 35 conceptually show a cross section passing through the first short circuit portion 4A and the second short circuit portion 4B, similarly to FIG. 4. Although the line feeding element 6 is not shown in FIGS. 34 and 35, the line feeding element 6 is formed at a position different from the illustrated cross section.

The casing 8 is formed by combining, for example, an upper casing and a lower casing that are vertically separable. The configuration of the casing 8 can be physically or virtually divided into a casing bottom 81, a lateral wall 82, and a casing top plate 83. The casing bottom 81 provides a bottom of the casing 8. The casing bottom 81 is formed in a flat plate shape. In the casing 8, the ground plate 1 is arranged so that the ground plate 1 faces the casing bottom 81. The lateral wall 82 provides a lateral surface of the casing 8, and extends upward from an edge of the casing bottom 81. The casing top plate 83 provides an upper surface of the casing 8. The casing top plate 83 in this embodiment is formed in a flat plate shape.

In one aspect, the configuration example shown in FIG. 35 corresponds to a configuration in which the line feeding element 6 is disposed on an inner surface of the casing top plate 83 and two counter conductor plates 3 are arranged side by side along the line feeding element 6. The line feeding element 6 is capable of feeding power by coming into contact with a feedline formed along, for example, the inner surface of the lateral wall 82. The height of the lateral wall 82 is designed so that a distance between the counter conductor plate 3 and the ground plate 1 have a value at which a desired capacitance is formed.

The casing 8 is made of, for example, a polycarbonate (i.e., PC) resin. The material of the casing 8 may employ various resins, such as polypropylene (i.e., PP) or synthetic resin obtained by mixing acrylonitrile-butadiene-styrene copolymer (so-called ABS) with the PC resin. The shape of the outer surface of the casing top plate 83 is not limited to the plate shape, and may be various other shapes such as a dome shape.

Figure 36:
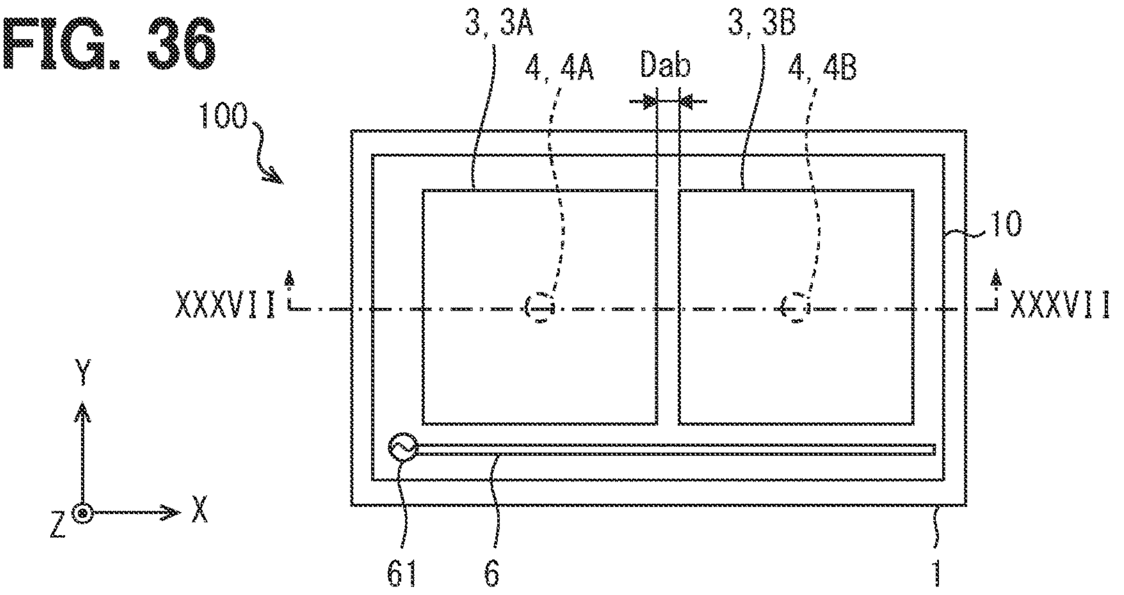
FIG. 36 is a diagram illustrating another configuration example.
Figure 37:
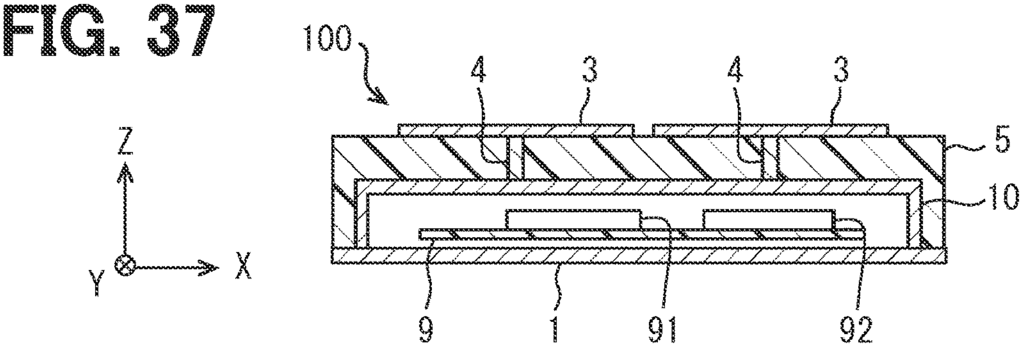
FIG. 37 is a schematic diagram illustrating a cross section taken along a line XXXVII-XXXVII illustrated in FIG. 36.

In addition, as illustrated in FIGS. 36 and 37, the antenna device 100 may include a metal shield casing 10 that accommodates a circuit board 9 on which a transceiver circuit 91 and a power supply circuit 92 are provided. The shield casing 10 is configured to protect various circuits from radio waves emitted by the mushroom cell 2, and thus can also be referred to as a circuit protection casing. FIG. 37 is a schematic diagram illustrating a configuration of the antenna device 100 in a cross section along the line XXXVII-XXXVII illustrated in FIG. 36. FIGS. 36 and 37 illustrate a configuration in which the shield casing 10 is formed in a flat rectangular parallelepiped shape having an opening on a lower surface. The shield casing 10 is disposed on the ground plate 1 such that the ground plate 1 is used as a bottom of the shield casing 10. Of course, as another aspect, the bottom of the shield casing 10 may be formed as a member independent of the ground plate 1. Here, the shield casing 10 is electrically connected to the ground plate 1 as an example. As another aspect, the shield casing 10 may not be electrically connected to the ground plate 1.

The transceiver circuit 91 is a circuit for executing at least one of transmission and reception of a radio signal, and executes various signal processes. The transceiver circuit 91 can be a circuit module that executes at least one of modulation, demodulation, frequency conversion, amplification, digital-to-analog conversion, and detection. The transceiver circuit 91 can be realized using, for example, an IC chip. The power supply circuit 92 is a circuit module that converts a voltage supplied from a vehicle power supply into an operating voltage for each circuit and outputs the operating voltage to each circuit. The power supply circuit 92 can be a circuit that switches a supply state of power to a circuit included in the antenna device 100 based on a control signal from a communication ECU.

Figure 38:
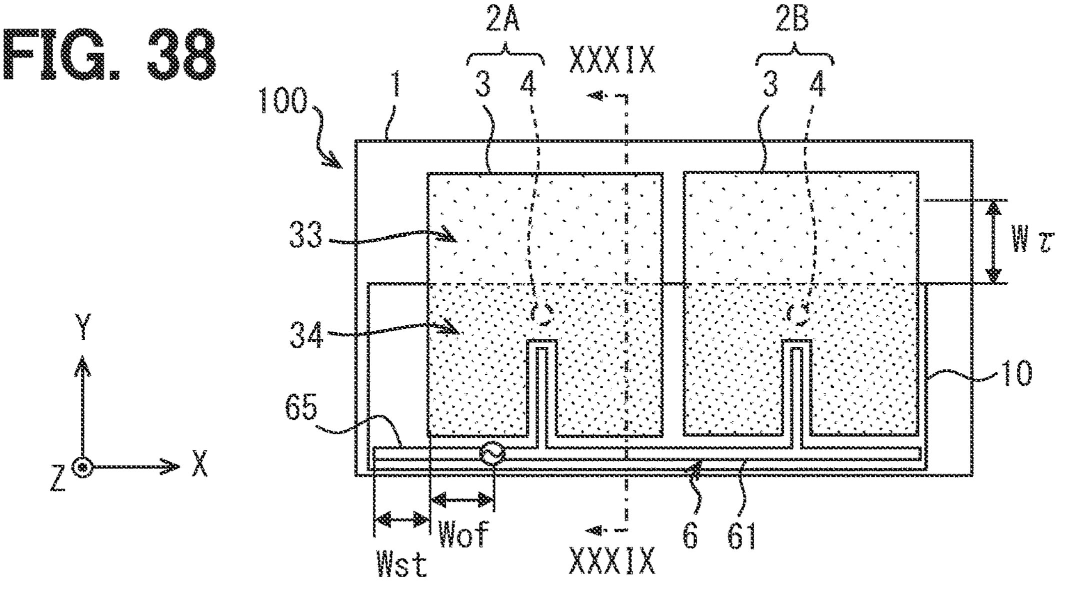
FIG. 38 is a diagram for explaining a third modified configuration.

Although FIG. 36 and the like disclose an aspect in which the shield casing has a sufficient size to face the entire surface of the counter conductor plate 3, the present disclosure is not limited thereto. For example, as illustrated in FIG. 38, the shield casing 10 may be set to have a dimensional/positional relationship such that a region of each counter conductor plate 3 is a non-overlapping portion 33 that does not overlap with the shield casing 10. For convenience, a portion of the counter conductor plate 3 that overlaps the shield casing 10 in a top view, that is, a region of the counter conductor plate 3 facing the shield casing 10 is also referred to as an overlapping portion 34. The example described above with reference to FIG. 36 corresponds to an example in which the whole of each counter conductor plate 3 forms the overlapping portion 34.

Figure 39:
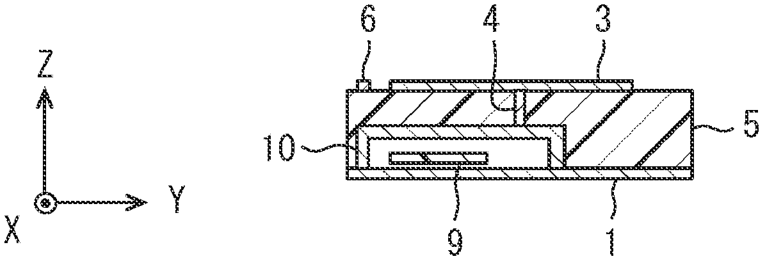
FIG. 39 is a schematic diagram illustrating a cross section taken along a line XXXIX-XXXIX illustrated in FIG. 38.

In FIG. 38, a dotted portion having a relatively low density of dots corresponds to the non-overlapping portion 33, and a dotted portion having a relatively high density of dots is corresponds to the overlapping portion 34. In FIG. 38, illustration of the support portion 5 is omitted to show the ground plate 1. FIG. 39 is a diagram conceptually illustrating a cross section along a line XXXIX-XXXIX shown in FIG. 38. The configuration illustrated in FIG. 38 corresponds to a configuration in which edges of the first counter conductor plate 3A and the second counter conductor plate 3B facing in the Y-axis positive direction protrude outward of the shield casing 10 in a top view.

For convenience, the configuration illustrated in FIG. 38 is also referred to as a third modified configuration. In the third modified configuration, the line feeding element 6 is disposed at a position overlapping the shield casing 10 in the top view, for example, along an edge of the shield casing 10 facing in the Y-axis negative direction. Of course, the line feeding element 6 may be provided at a position not overlapping the shield casing 10.

Further, in the line feeding element 6, the feeding point is offset by a predetermined offset amount Wof in the X-axis positive direction from an edge of the first counter conductor plate 3A facing in the X-axis negative direction. The offset amount Wof is set to, for example, 16 mm. The offset amount Wof can be changed to a value capable of achieving impedance matching in a range of 0 mm to 20 mm. Further, in the third modified configuration, the line feeding element 6 includes a stub portion 65 protruding further in the X-axis negative direction than the edge of the first counter conductor plate 3A facing in the X-axis negative direction. The stub portion 65 corresponds to a part of the main line portion 64. A length Wst of the stub portion 65 is, for example, 40 mm. The stub portion 65 is an arbitrary element for enhancing impedance matching. The length Wst of the stub portion 65 can be appropriately changed to 10 mm or 20 mm.

In the third modified configuration, the distance H between the ground plate 1 and the counter conductor plate 3 is set to 20 mm, and the distance between the upper surface of the shield casing 10 and the counter conductor plate 3 is set to 6.5 mm. The dimensions of each counter conductor plate 3 are set such that Wx1=Wx2=60 mm and Wy1=Wy2=80 mm. These set values are examples of parameters indicating conditions of a simulation described later, and can be appropriately changed.

In the example illustrated in FIG. 36, the capacitance formed by the counter conductor plate 3 is determined by the distance in the Z-axis direction between the upper surface of the shield casing 10 and the counter conductor plate 3. Since the shield casing 10 is electrically connected to the ground plate 1 and functions as a member that provides a ground potential, the shield casing 10 can be regarded as a part of the ground plate 1 in one side surface of the shield casing 10.

In the third modified configuration, the main target frequency is determined based on the total value of a overlapping capacitance that is a capacitance formed by the overlapping portion 34 and the shield casing 10 and a non-overlapping capacitance that is a capacitance formed by the non-overlapping portion 33 and the ground plate 1. The non-overlapping capacitance is determined based on the distance between the counter conductor plate 3 and the ground plate 1 and the area of the non-overlapping portion 33. The overlapping capacitance is determined according to the distance between the counter conductor plate 3 and the shield casing 10 and the area of the overlapping portion 34. Those skilled in the art can set the dimensions of each configuration so that the antenna device 100 operates at a desired main target frequency.

In order to reduce the size of the device, it is preferable that the distance between the ground plate 1 and the counter conductor plate 3 is small. This is because, as the distance between the ground plate 1 and the counter conductor plate 3 is smaller, the height of the device can be reduced, and the electrostatic capacitance formed by the counter conductor plate 3 in cooperation with the ground plate 1 or the shield casing 10 is increased, so that the area of the counter conductor plate 3 can also be reduced.

However, in the configuration in which the entire counter conductor plate 3 is disposed so as to face the shield casing 10 as illustrated in FIG. 36, the electrical volume as an antenna is small, and the radiation resistance can be, for example, ⅓ or less of 50Ω which is a general resistance value of a feedline. As the radiation resistance is smaller, the range in which the impedance can be matched is narrowed, and the operating band of the antenna device 100 is narrowed. More specifically, when a coaxial cable of 50Ω is used, the VSWR exceeds 3 if the impedance of the antenna is 18Ω or less. Assuming that the radiation resistance of the antenna is ZL and the impedance of the communication cable is Z0, qualitatively, the reflection coefficient Γ is determined by |(ZL−Z0)/(ZL+Z0)|, and the VSWR is determined by (1+Γ)/(1−Γ). Note that Γ corresponds to S11 among the S-parameters. This qualitative expression also shows that when the radiation resistance is too small, the VSWR increases (i.e., deteriorates).

With respect to such an issue, according to the configuration in which the non-overlapping portion 33 is provided as illustrated in FIG. 38, the electrical volume increases, and the radiation resistance also increases. As a result, the frequency range in which the VSWR is equal to or less than 3 can be increased. That is, according to the configuration in which the non-overlapping portion 33 is provided, both downsizing of the antenna device 100 and broadening of the bandwidth of the antenna device 100 can be achieved. A protrusion width $W_T$, which is the length of the non-overlapping portion 33 in the Y-axis direction, can be appropriately changed so as to obtain a desired radiation resistance. The protrusion width $W_T$ can be set so that the input impedance and the output impedance match. The protrusion width $W_T$ can be set to, for example, 10 mm, 15 mm, or 20 mm. The protrusion width $W_T$ may be adjusted by adjusting the length of the counter conductor plate 3 in the Y-axis direction, or may be adjusted by adjusting the length of the shield casing 10 in the Y-axis direction. The protrusion width $W_T$ of the first counter conductor plate 3A and the protrusion width $W_T$ of the second counter conductor plate 3B may be different from each other.

Figure 40:
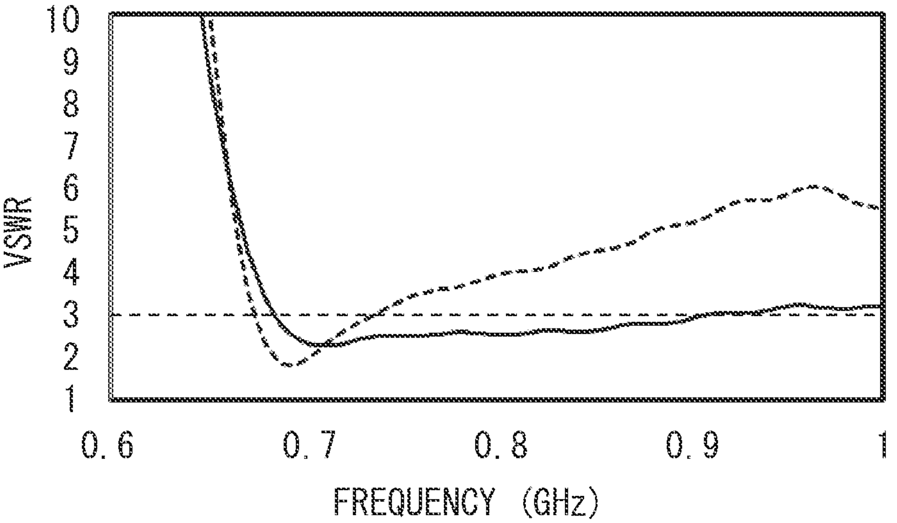
FIG. 40 is a diagram illustrating a VSWR characteristic in the third modified configuration.

FIG. 40 is a graph illustrating a measurement result of the VSWR between the third modified configuration illustrated in FIG. 38 and a predetermined third comparative configuration. Here, the third comparative configuration is a configuration in which the non-overlapping portion 33 is not provided in the counter conductor plate 3, that is, a configuration in which the entire surface of the counter conductor plate 3 is the overlapping portion. In both the third modified configuration and the third comparative configuration, the length of each of the first counter conductor plate 3A and the second counter conductor plate 3B in the Y-axis direction is set to 80 mm and the length thereof in the X-axis direction is set to 60 mm. The protrusion width $W_T$ of the third modified configuration is set to 20 mm. In FIG. 40, the solid line indicates the VSWR for each frequency of the third modified configuration, and the dashed line indicates the VSWR for each frequency of the third comparative configuration. FIG. 40 shows test results of the VSWR in a range of relatively 650 MHz to 1000 MHz as an example.

Figure 41:
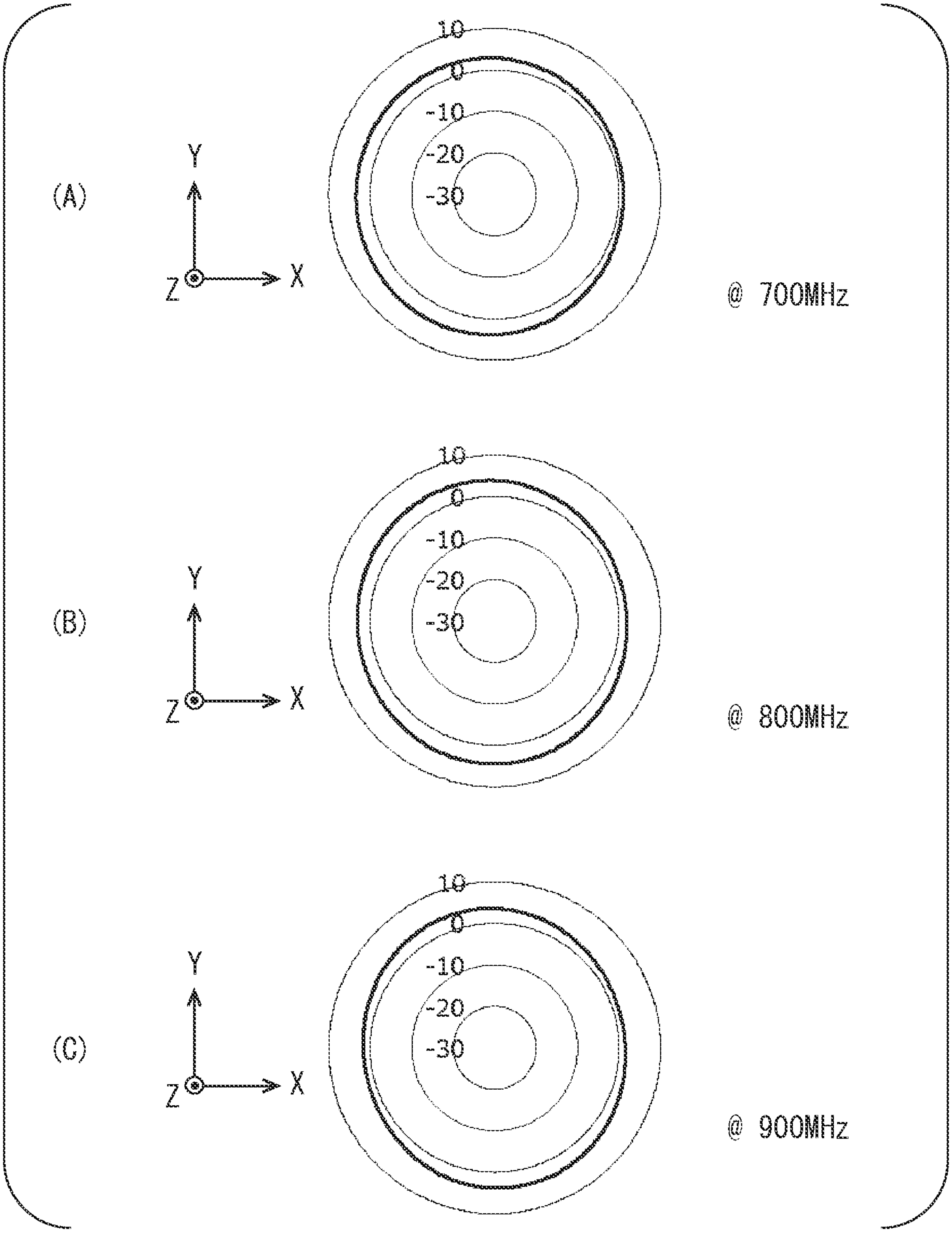
FIG. 41 is a diagram illustrating a result of testing directivity in the third modified configuration.

As illustrated in FIG. 40, according to the third modified configuration, the radiation resistance increases as the electrical volume increases due to the non-overlapping portion 33, and thus the impedance matching range can be expanded and the operating band can be widened. FIG. 41 shows the results of simulating the directivities at 700 MHz, 800 MHz, and 900 MHz in the third modified configuration. As shown in FIG. 41, it can be seen that the antenna has radiation characteristics in all directions in the antenna horizontal direction at any frequency, in other words, the antenna operates as a metamaterial antenna.

Figure 42:
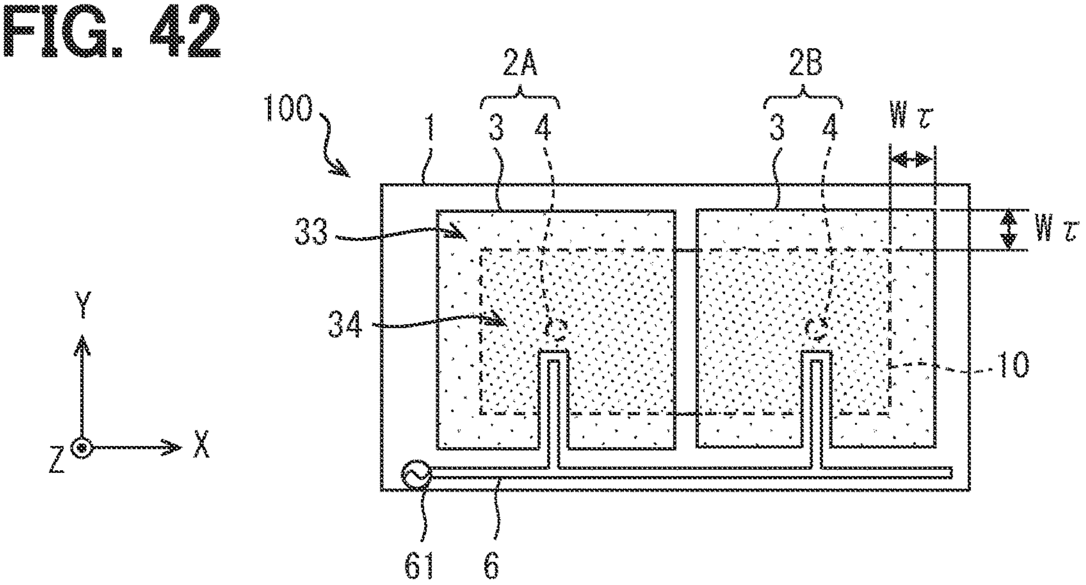
FIG. 42 is a diagram illustrating another configuration example.

Although FIG. 40 discloses the configuration in which the shield casing 10 is disposed so that the non-overlapping portion 33 is formed at a position shifted from the shield casing 10 in the Y-axis positive direction, the positional relationship between the counter conductor plate 3 and the shield casing 10 is not limited thereto. For example, the non-overlapping portion 33 may be formed at a position shifted from the shield casing 10 in the Y-axis negative direction. As illustrated in FIG. 42, the shield casing 10 may be disposed at the center of a rectangular region including the first counter conductor plate 3A and the second counter conductor plate 3B, and the non-overlapping portion 33 may be formed in all directions when viewed from the center of the antenna device 100.

A configuration shown in FIG. 42 corresponds to a configuration in which an edge of the first counter conductor plate 3A facing in the Y-axis positive direction, an edge of the first counter conductor plate 3A facing in the Y-axis negative direction, and an edge of the first counter conductor plate 3A facing in the X-axis negative direction protrude outward of the shield casing 10. A configuration shown in FIG. 42 corresponds to a configuration in which an edge of the second counter conductor plate 3B facing in the Y-axis positive direction, an edge of the second counter conductor plate 3B facing in the Y-axis negative direction, and an edge of the second counter conductor plate 3B facing in the X-axis negative direction protrude outward of the shield casing 10. In short, the configuration shown in FIG. 42 corresponds to an example in which edges located on both sides in a direction orthogonal to the arrangement direction are arranged to protrude outward of the shield casing 10. A protrusion width $W_T$ in the X-axis direction and a protrusion width $W_T$ in the Y-axis direction may be the same as or different from each other. In addition, the protrusion width $W_T$ in the X-axis direction may be 0 according to the dimension of the shield casing 10.

Note that a configuration in which the non-overlapping portion 33 is provided as described above or various configurations can also include the casing 8. A gel as a sealing material may be sealed inside the casing 8 so as to cover each of the counter conductor plates 3.

<Supplement on Power Supply Method>

Figure 43:
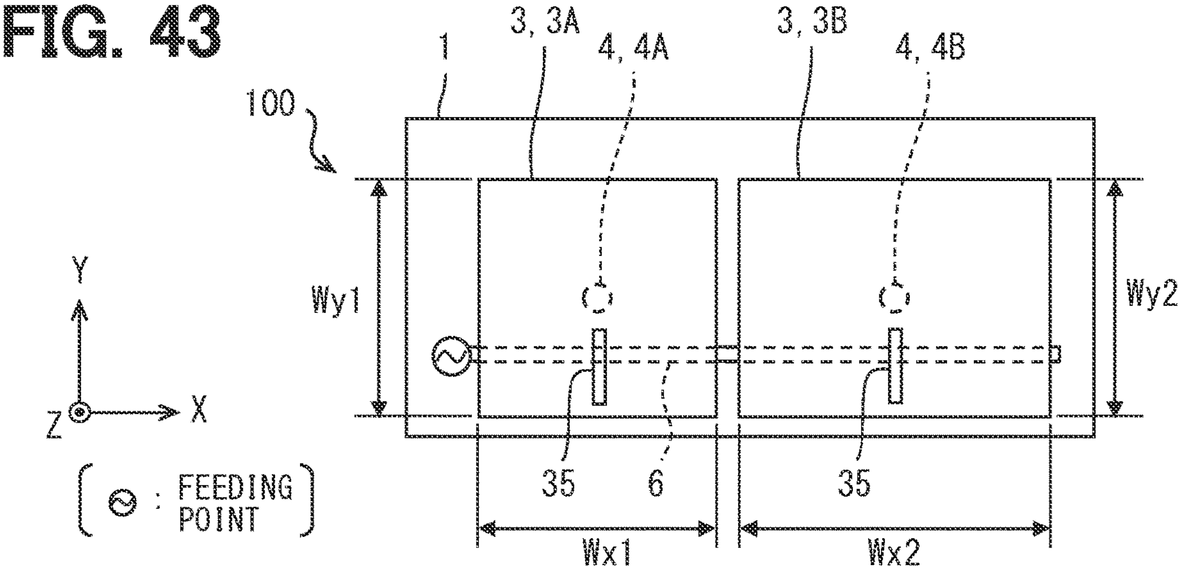
FIG. 43 is a diagram for explaining a fourth modified configuration.

In the above, a configuration is described, in which the line feeding element 6 is provided on the same plane as the counter conductor plate 3 and the edge of the counter conductor plate 3 and the line feeding element 6 are electromagnetically coupled to each other to feed power to the counter conductor plate 3. However, the indirect power feeding method to the counter conductor plate 3 is not limited thereto. For example, as illustrated in FIG. 43, the line feeding element 6 may be disposed below the counter conductor plate 3, and a slot 35 may be provided above the line feeding element 6 in the counter conductor plate 3, so that power is fed through the slot 35. For convenience, the proposed configuration modified to supply power via the slot 35 is also referred to as a fourth modified configuration.

The slot 35 provided in each counter conductor plate 3 has a rectangular shape having a long side with length three times or more a length of a short side, and is provided in an orientation in which the longitudinal direction is perpendicular to the line feeding element 6 in a top view. The slot 35 is provided immediately above the line feeding element 6, for example, in an orientation in which the conductor plate center is located on a line extending from the slot 35 in the longitudinal direction. Here, as an example, since the line feeding element 6 extends in the X-axis direction, the slot 35 is provided in an orientation in which the longitudinal direction is parallel to the Y-axis. The length of the slot 35 in the Y-axis direction can be set to, for example, 5 mm to 25 mm. The length of the slot 35 in the X-axis direction can be set to, for example, 1 mm to 5 mm. The shape of the slot 35 may be, for example, a shape other than a rectangular shape such as a dog bone shape for the purpose of improving the coupling degree. The slot 35 provided in the first counter conductor plate 3A and the slot 35 provided in the second counter conductor plate 3B may have different lengths in the X-axis direction or/and the Y-axis direction.

According to the above configuration, since the line feeding element 6 can be disposed above or below the counter conductor plate 3, the length in the Y-axis direction or the X-axis direction of the entire device can be reduced. Further, by adjusting the position of the slot 35, a substantial power supply position to the mushroom cell 2 can be changed. Therefore, there is an advantage that impedance matching can be easily performed, as compared with the proposed configuration.

Figure 44:
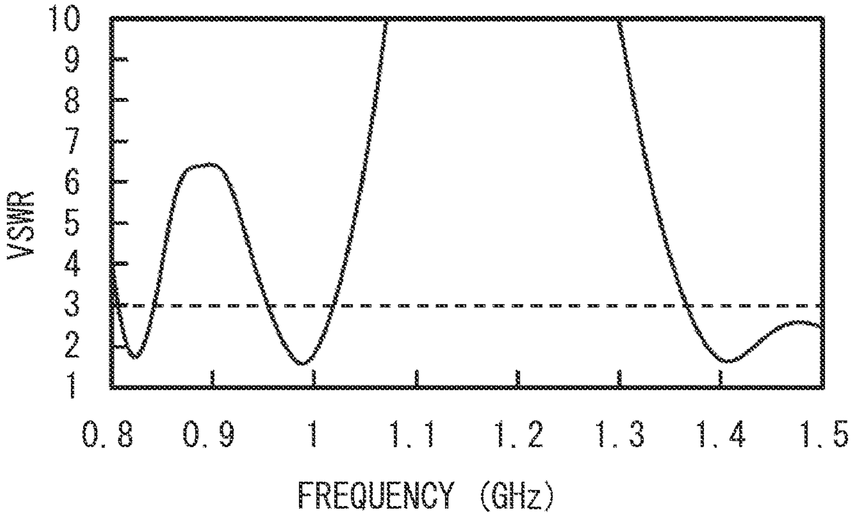
FIG. 44 is a diagram illustrating a VSWR characteristic in the fourth modified configuration.

According to the configuration in which power is supplied from above or below the counter conductor plate 3 using the slot 35, as illustrated in FIG. 44, the antenna device 100 can be operated at multiple frequencies. FIG. 44 shows the VSWR characteristics in the case where Wy1=Wy2=57 mm, Wx1=40 mm, and Wx2=70 mm are set. The line feeding element 6 is parallel to the X axis at a position 11 mm away from the short circuit portion 4 in the Y-axis negative direction in a plane 0.8 mm below the counter conductor plate 3. The length (i.e., width) of the slot 35 of the first counter conductor plate 3A in the X-axis direction is set to 2 mm, and the length of the slot 35 of the first counter conductor plate 3A in the Y-axis direction is set to 23 mm. The width of the slot 35 of the second counter conductor plate 3B is set to 1 mm, and the length of the slot 35 of the second counter conductor plate 3B in the Y-axis direction is set to 23 mm.

Figure 45:
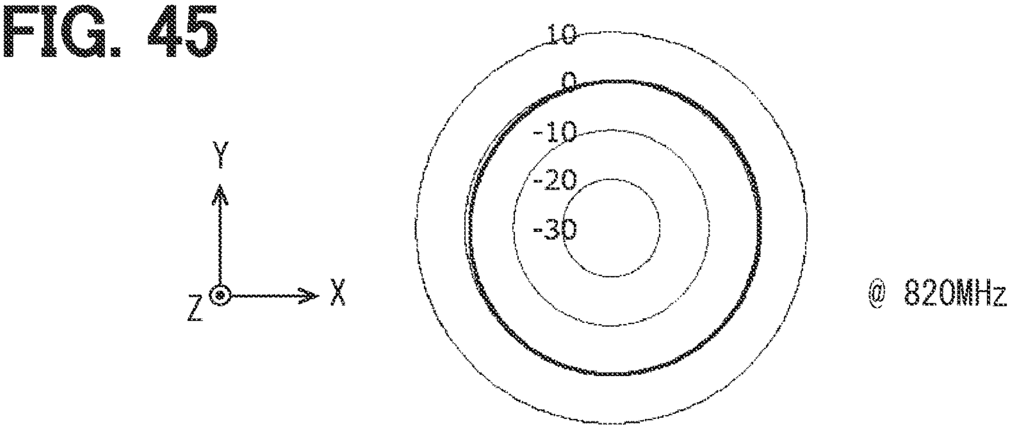
FIG. 45 is a diagram illustrating directivity at 820 MHz in the fourth modified configuration.
Figure 46:
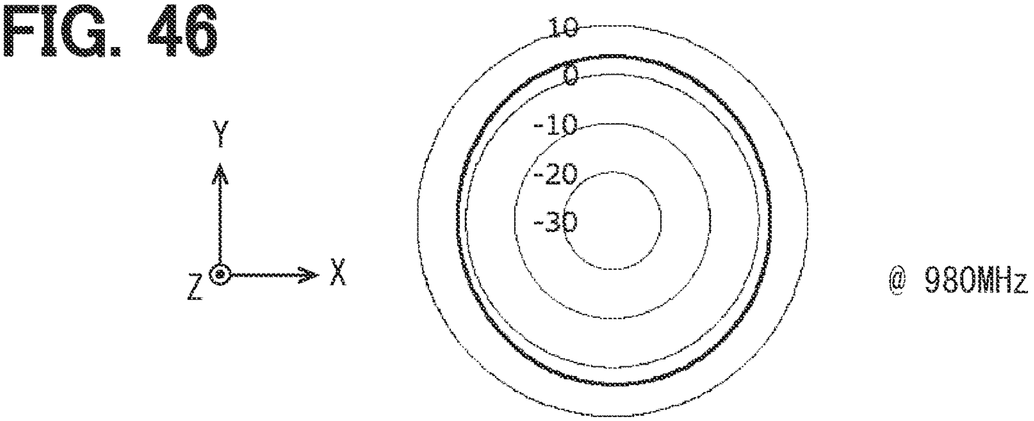
FIG. 46 is a diagram illustrating directivity at 980 MHz in the fourth modified configuration.

According to the above configuration, as shown in FIG. 44, the antenna device 100 can be operated as a metamaterial antenna in the vicinity of 820 MHz and in the vicinity of 980 MHz. FIG. 45 shows the directivity at 820 MHz, and FIG. 46 shows the directivity at 980 MHz. As shown in FIGS. 45 and 46, it can be seen that sub frequencies other than the main target frequency also exhibit non-directivity in the antenna horizontal direction and the antenna device 100 operate as a metamaterial antenna. These results mean that the antenna device 100 can be operated as a metamaterial antenna at a relatively low frequency and can be operated in multiple frequency bands without significantly changing the dimensions of the counter conductor plate 3 and the like from a configuration in which 1.3 GHz is the main target frequency.

<Use of the Antenna Device 100>

The antenna device 100 described above is used while being attached to a center of a roof portion of a vehicle or a position shifted frontward or rearward by a predetermined amount from the center, for example. The antenna device 100 may be placed on a substantially flat iron plate forming the roof portion, or may be accommodated in a recess or a hole portion for attaching the antenna device 100 provided in the roof portion. In addition, the antenna device 100 may be used while being attached to a ceiling surface in a vehicle compartment or an upper surface of a dashboard. Since the directivity of the antenna device 100 is high in the direction orthogonal to the thickness direction, the antenna device 100 attached at the above-described attachment position can function as a device for receiving radio waves coming from the horizontal direction or obliquely above. More specifically, the antenna device 100 can function as an apparatus for communicating with a radio base station constituting a mobile communication system such as 3G, LTE, 4G, or 5G.

As another application, the antenna device 100 may be attached to an outer surface of the vehicle such as a pillar, a door panel, or a bumper of the vehicle in an orientation in which the ground plate 1 is substantially parallel to the body surface to which the antenna device is attached. According to this configuration, since a beam is formed in the direction along the body of the vehicle, for example, it can be used as a communication device for determining whether a mobile terminal of a user is present in the vicinity of the vehicle. Alternatively, it may be attached near a center of a floor portion or a ceiling portion in the vehicle compartment and used as a device for wirelessly communicating with a mobile terminal carried by a user.

In addition to the antenna device 100 described above, the scope of the present disclosure includes various modes such as a vehicle communication system including the antenna device 100 as a component and a vehicle including the antenna device 100. The antenna device 100 is not limited to one used in a vehicle. The present disclosure can be applied to a communication device in a building, a roadside unit that is a communication facility disposed along a road, and the like. In addition, the antenna device 100 is not limited to one for performing data communication, and can also be used as an antenna device for position estimation that specifies a position of a communication partner on the basis of a transmission/reception result of a wireless signal. That is, the antenna device 100 may be used as an anchor node in a technical field of position estimation using radio signals.

What is claimed is:

1. An antenna device comprising:
- a ground plate that is a conductor member having a flat shape;
- a line feeding element that is a line conductor member formed in a non-loop shape and provided with a feeding point at an arbitrary position;
- a first mushroom cell that is conductive; and
- a second mushroom cell that is conductive, wherein
- each of the first mushroom cell and the second mushroom cell includes
  - a counter conductor plate that is conductive and flat and disposed at a predetermined interval from the ground plate, and
  - a short circuit portion that electrically connects the counter conductor plate and the ground plate,
- each of the first mushroom cell and the second mushroom cell is configured to cause parallel resonance at a predetermined target frequency using an inductance of the short circuit portion and an electrostatic capacitance formed by the ground plate and the counter conductor plate, and
- the line feeding element is disposed such that an interval between the line feeding element and the counter conductor plate of the first mushroom cell and an interval between the line feeding element and the counter conductor plate of the second mushroom cell are less than a predetermined coupling limit value,
- the antenna device further comprising
- a shield casing that is made of metal and houses a circuit board having a circuit that executes a signal process for transmitting or receiving a radio signal of the predetermined target frequency, wherein
- the shield casing is disposed between the ground plate and the counter conductor plate and electrically connected to the ground plate.

2. The antenna device according to claim 1, wherein
- an edge of the counter conductor plate of each of the first mushroom cell and the second mushroom cell has a part extending outward of the shield casing in a top view.

3. The antenna device according to claim 2, wherein
- the first mushroom cell and the second mushroom cell are arranged at a predetermined interval in a predetermined arrangement direction, and
- a length of the counter conductor plate of each of the first mushroom cell and the second mushroom cell in a width direction, which is a direction orthogonal to the arrangement direction, is set to be larger than a length of the shield casing in the width direction.

4. The antenna device according to claim 3, wherein
- the counter conductor plate of each of the first mushroom cell and the second mushroom cell has a rectangular shape, and
- edges of the counter conductor plate of each of the first mushroom cell and the second mushroom cell on both sides in the width direction extend outward of the shield casing.

5. The antenna device according to claim 1, further comprising:
- a circuit module configured to execute signal processing for transmitting or receiving a radio signal of a predetermined target frequency.

6. The antenna device according to claim 1, wherein
- the predetermined coupling limit value is 0.02λ or less, where λ is a wavelength of the radio signal having the predetermined target frequency.

7. An antenna device comprising:
- a ground plate that is a conductor member having a flat shape;
- a line feeding element that is a line conductor member formed in a non-loop shape and provided with a feeding point at an arbitrary position;
- a first mushroom cell that is conductive; and
- a second mushroom cell that is conductive, wherein
- each of the first mushroom cell and the second mushroom cell includes
  - a counter conductor plate that is conductive and flat and disposed at a predetermined interval from the ground plate, and
  - a short circuit portion that electrically connects the counter conductor plate and the ground plate,
- each of the first mushroom cell and the second mushroom cell is configured to cause parallel resonance at a predetermined target frequency using an inductance of the short circuit portion and an electrostatic capacitance formed by the ground plate and the counter conductor plate,
- the line feeding element is disposed such that an interval between the line feeding element and the counter conductor plate of the first mushroom cell and an interval between the line feeding element and the counter conductor plate of the second mushroom cell are less than a predetermined coupling limit value,
- the line feeding element is located in proximity to a part of an edge of the counter conductor plate of each of the first mushroom cell and the second mushroom cell,
- the counter conductor plate of each of the first mushroom cell and the second mushroom cell includes
  - a proximate edge that is the edge located in proximity to the line feeding element, and
  - a cut portion extending inward from the proximate edge, and
- the line feeding element includes a branch portion extending into the cut portion.

8. The antenna device according to claim 7, wherein the first mushroom cell and the second mushroom cell are arranged at a predetermined interval in a predetermined arrangement direction, and the line feeding element includes a main line portion extending in the arrangement direction, and the branch portion, the branch portion and the cut portion are perpendicular to the main line portion, and an interval between the cut portion and the branch portion is less than the predetermined coupling limit value.

9. An antenna device comprising:

a ground plate that is a conductor member having a flat shape;

a line feeding element that is a line conductor member formed in a non-loop shape and provided with a feeding point at an arbitrary position;

a first mushroom cell that is conductive; and a second mushroom cell that is conductive, wherein each of the first mushroom cell and the second mushroom cell includes a counter conductor plate that is conductive and flat and disposed at a predetermined interval from the ground plate, and a short circuit portion that electrically connects the counter conductor plate and the ground plate, each of the first mushroom cell and the second mushroom cell is configured to cause parallel resonance at a predetermined target frequency using an inductance of the short circuit portion and an electrostatic capacitance formed by the ground plate and the counter conductor plate, the line feeding element is disposed such that an interval between the line feeding element and the counter conductor plate of the first mushroom cell and an interval between the line feeding element and the counter conductor plate of the second mushroom cell are less than a predetermined coupling limit value, the counter conductor plate of the first mushroom cell and the counter conductor plate of the second mushroom cell are arranged at a predetermined interval in a predetermined arrangement direction on the same plane, the line feeding element is disposed above or below the counter conductor plate and extends in the arrangement direction, and the counter conductor plate of each of the first mushroom cell and the second mushroom cell has a power feeding slot in a part of a portion of the counter conductor plate facing the line feeding element.

10. An antenna device comprising:

a ground plate that is a conductor member having a flat shape;

a line feeding element that is a line conductor member formed in a non-loop shape and provided with a feeding point at an arbitrary position;

a first mushroom cell that is conductive; and a second mushroom cell that is conductive, wherein each of the first mushroom cell and the second mushroom cell includes a counter conductor plate that is conductive and flat and disposed at a predetermined interval from the ground plate, and a short circuit portion that electrically connects the counter conductor plate and the ground plate, each of the first mushroom cell and the second mushroom cell is configured to cause parallel resonance at a predetermined target frequency using an inductance of the short circuit portion and an electrostatic capacitance formed by the ground plate and the counter conductor plate, the line feeding element is disposed such that an interval between the line feeding element and the counter conductor plate of the first mushroom cell and an interval between the line feeding element and the counter conductor plate of the second mushroom cell are less than a predetermined coupling limit value, and a first counter conductor plate, which is the counter conductor plate of the first mushroom cell, and a second counter conductor plate, which is the counter conductor plate of the second mushroom cell, have different dimensions from each other.

11. An antenna device comprising:

a ground plate that is a conductor member having a flat shape;

a line feeding element that is a line conductor member formed in a non-loop shape and provided with a feeding point at an arbitrary position;

a first mushroom cell that is conductive; and a second mushroom cell that is conductive, wherein each of the first mushroom cell and the second mushroom cell includes a counter conductor plate that is conductive and flat and disposed at a predetermined interval from the ground plate, and a short circuit portion that electrically connects the counter conductor plate and the ground plate, each of the first mushroom cell and the second mushroom cell is configured to cause parallel resonance at a predetermined target frequency using an inductance of the short circuit portion and an electrostatic capacitance formed by the ground plate and the counter conductor plate, the line feeding element is disposed such that an interval between the line feeding element and the counter conductor plate of the first mushroom cell and an interval between the line feeding element and the counter conductor plate of the second mushroom cell are less than a predetermined coupling limit value, and the interval between the counter conductor plate of the first mushroom cell and the line feeding element is different from the interval between the counter conductor plate of the second mushroom cell and the line feeding element.

* * * * *